United States Patent
Zhang et al.

(10) Patent No.: US 10,887,593 B2
(45) Date of Patent: Jan. 5, 2021

(54) PARALLEL TABLE-BASED BIT RATE ESTIMATOR

(71) Applicants: Yuanzhi Zhang, Carbondale, IL (US); Chao Lu, Makanda, IL (US)

(72) Inventors: Yuanzhi Zhang, Carbondale, IL (US); Chao Lu, Makanda, IL (US)

(73) Assignee: Board of Trustees of Southern Illinois University, Carbondale, IL (US)

( * ) Notice: Subject to any disclaimer, the term of this patent is extended or adjusted under 35 U.S.C. 154(b) by 20 days.

(21) Appl. No.: 16/389,092

(22) Filed: Apr. 19, 2019

(65) Prior Publication Data

US 2019/0327473 A1   Oct. 24, 2019

Related U.S. Application Data

(60) Provisional application No. 62/660,311, filed on Apr. 20, 2018.

(51) Int. Cl.
| | |
|---|---|
| *H04N 19/147* | (2014.01) |
| *H04N 19/13* | (2014.01) |
| *H04N 19/149* | (2014.01) |
| *H04N 19/184* | (2014.01) |
| *H04N 19/186* | (2014.01) |
| *H04N 19/70* | (2014.01) |
| *H04N 19/46* | (2014.01) |

(52) U.S. Cl.
CPC .......... *H04N 19/13* (2014.11); *H04N 19/147* (2014.11); *H04N 19/149* (2014.11); *H04N 19/184* (2014.11); *H04N 19/186* (2014.11); *H04N 19/70* (2014.11); *H04N 19/46* (2014.11)

(58) Field of Classification Search
CPC .... H04N 19/13; H04N 19/147; H04N 19/149; H04N 19/184; H04N 19/186; H04N 19/70; H04N 19/46
USPC ..................................................... 375/240.02
See application file for complete search history.

(56) References Cited

U.S. PATENT DOCUMENTS

| | | |
|---|---|---|
| 2013/0287120 A1 | 10/2013 | Kwon et al. |
| 2016/0007046 A1 | 1/2016 | Chou |

OTHER PUBLICATIONS

Bossen F, CE1: Table-Based Bit Estimation for CABAC, Document: JCTVC-G763, presented at the Joint Collaborative Team on Video Coding (JCT-VC) of ITU-T SG16 WP3 and ISO/IEC JTC1/SC29/WG11 7th Meeting, Nov. 21-30, 2011, Geneva, Switzerland.
Huang X et al., Fast Algorithms and VLSI Architecture Design for HEVC Intra-Mode Decision, Journal of Real-Time Image Processing, 2016, pp. 285-302, vol. 12, No. 2.
Johar S and Alwani M, Method for Fast Bits Estimation in Rate Distortion for Intra Coding Units in HEVC, Proceedings of the 10th Annual IEEE Consumer Communications and Networking Conference, 2013, pp. 721-724.

(Continued)

*Primary Examiner* — Nguyen T Truong
(74) *Attorney, Agent, or Firm* — Greer, Burns & Crain, Ltd.; Steven P. Fallon

(57) ABSTRACT

A highly parallel bit rate estimator and method for estimating bit rate are provided for high efficiency video coding applications. The electrical hardware architecture groups syntax elements into independent processing groups and utilizes a table-based context-adaptive binary arithmetic coding scheme to more rapidly estimate bit rates and optimize compression of high-definition videos.

14 Claims, 11 Drawing Sheets

Table-based CABAC Bit Number Estimator

(56) References Cited

OTHER PUBLICATIONS

Ju C-C et al., A 0.5nJ/Pixel 4K H.265/HEVC Codec LSI for Multi-Format Smartphone Applications, Proceedings of the International Solid-State Circuit Conference (ISSCC), 2015, pp. 336-338.

Lainema J et al., Intra Coding of the HEVC Standard, IEEE Transactions on Circuits and Systems for Video Technology, 2012, pp. 1792-1801, vol. 22, No. 12.

Lee B and Kim M, A Cu-Level Rate and Distortion Estimation Scheme for RDO of Hardware-Friendly HEVC Encoders Using Low-Complexity Integer DCTs, IEEE Transactions on Image Processing, 2016, pp. 3787-3800, vol. 25, No. 3.

Ma S et al., Low Complexity Rate Distortion Optimization for HEVC, Proceedings of the International Data Compression Conference, 2013, pp. 73-82.

Ohm J-R et al., Comparison of the Coding Efficiency of Video Coding Standards—Including High Efficiency Video Coding (HEVC), IEEE Transactions on Circuits and Systems for Video Technology, 2012, pp. 1669-1684, vol. 22, No. 12.

Pastuszak G and Abramowski A., Algorithm and Architecture Design of the H.265/HEVC Intra Encoder, IEEE Transactions on Circuits and Systems for Video Technology, 2016, pp. 210-222, vol. 26, No. 1.

Sharabayko M and Ponomarev O, Fast Rate Estimation for RDO Mode Decision in HEVC, Entropy, 2014, pp. 6667-6685, vol. 16, No. 12.

Shen W et al., A Hardware-Friendly Method for Rate-Distortion Optimization of HEVC Intra Coding, Proceedings of the International Symposium on VLSI Design, Automation and Test, 2014, pp. 1-4.

Sheng Z et al., Low-Complexity Rate-Distortion Optimization Algorithms for HEVC Intra Prediction, MultiMedia Modeling, 20th Anniversary International Conference, Dublin, Ireland, Jan. 6-10, 2014, Proceedings Part I, Lecture Notes in Computer Science, pp. 541-552, vol. 8325, Springer International Publishing, Berlin, Germany.

Sullivan G et al., Overview of the High Efficiency Video Coding (HEVC) Standard, IEEE Transactions on Circuits and Systems for Video Technology, 2012, pp. 1649-1668, vol. 22, No. 12.

Tsai S-F et al., A 1062Mpixels/s 8192×4320p High Efficiency Video Coding (H.265) Encoder Chip, Proceedings of the Symposium on VLSI Circuits, 2013, pp. C188-C189.

Tu Y-K et al., Efficient Rate-Distortion Estimation for H.264/AVC Coders, IEEE Transactions on Circuits and Systems or Video Technology, 2006, pp. 600-611, vol. 16, No. 5.

Zhang H and Ma Z, Fast Intra Mode Decision for High Efficiency Video Coding (HEVC), IEEE Transactions on Circuits and Systems for Video Technology, 2014, pp. 660-668, vol. 24, No. 4.

Zhao X et al., Novel Statistical Modeling, Analysis and Implementation of Rate-Distortion Estimation for H.264/AVC Coders, IEEE Transactions on Circuits and Systems for Video Technology, 2010, pp. 647-660, vol. 20, No. 5.

Zhu J et al., Fast Prediction Mode Decision with Hadamard Transform Based Rate-Distortion Cost Estimation for HEVC Intra Coding, 2013, Proceedings of the IEEE International Conference on Image Processing, pp. 1977-1981.

Zhu J et al., HDTV1080p HEVC Intra Encoder with Source Texture Based Cu/Pu Mode Pre-Decision, Proceedings of the 19th Asia and South Pacific Design Automation Conference (ASP-DAC), 2014, pp. 367-372.

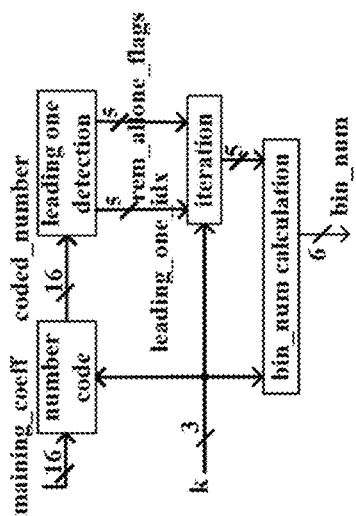
FIG. 7C
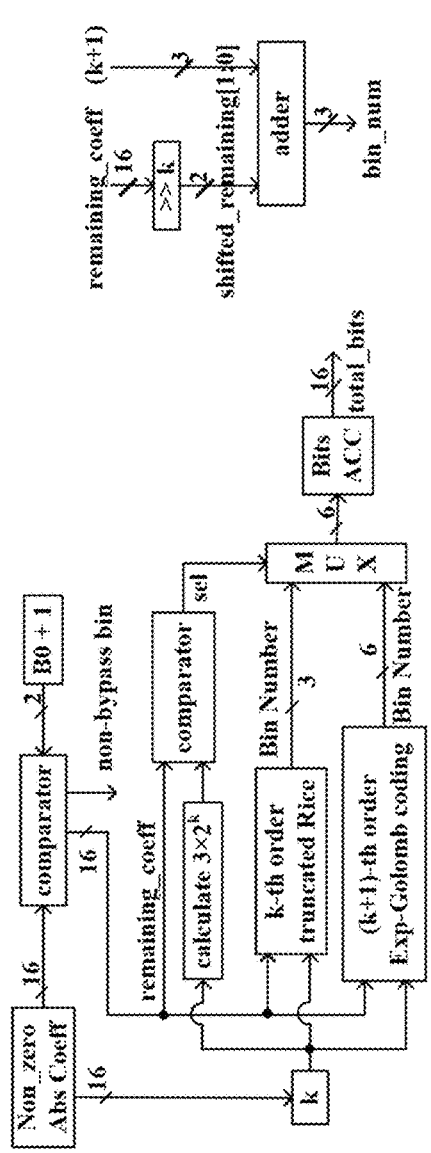
FIG. 7B
FIG. 7A

PARALLEL TABLE-BASED BIT RATE ESTIMATOR

PRIORITY CLAIM AND REFERENCE TO RELATED APPLICATION

The application claims priority under 35 U.S.C. § 119 and all applicable statutes and treaties from prior U.S. provisional application Ser. No. 62/660,311, which was filed Apr. 20, 2018.

PRIORITY CLAIM AND REFERENCE TO RELATED APPLICATION

A field of the invention is high efficiency video encoding (HEVC).

BACKGROUND OF THE INVENTION

The basic task performed by a video encoder is compression, with the goal of maximum compression with minimum quality loss. Video encoders, including those complying the HEVC standard conduct encoding via a number of basic steps. Frames of incoming videos data are partitioned into multiple units. The units are then predicted with one of inter or intra mode prediction. The prediction is subtracted from the unit, which reduces the data necessary for transmission. The result of the subtraction is transformed and quantized. The transform output, prediction information, mode information and headers are then encoded and transmitted. The transmitted information complies with a standard, such as HEVC, to permit decoding by a decoder. The HEVC standard defines the syntax or format of a compressed video sequence and a method of decoding a compressed sequence. This provides freedom for the encoder design.

HEVC also known as H.265, debuted in 2013 as the new industry standard for enabling advanced video compression for emerging applications such as ultra-high-definition (UHD) 4 k/8 k TV. HEVC maintains the same video quality as its predecessor standard, H.264, but boosts compression efficiency by around 50% by introducing new concepts and features such as the coding tree unit (CTU), which replaces the legacy macroblock architecture of H.264. Each coded video frame is partitioned into blocks, which are further partitioned into the CTUs. The CTU is the basic unit of coding, analogous to a macroblock in earlier standards, and can be up to 64×64 pixels in size. A CTU may vary in size from 64×64 to 16×16 and contains one or more coding units (CUs) sized from 8×8 to 64×64. According to a quad-tree structure, a CU may be split into four smaller CUs. A CU is associated with prediction units (PUs) and transform units (TUs). A PU, sized from 4×4 to 64×64, includes luma and chroma prediction information. Discrete sine transform (DST) and discrete cosine transform (DCT) are allowed in TUs to transform prediction errors. DST deals with luma prediction residuals in 4×4 TUs, while other TUs are transformed by DCT. In addition to the CTU concept, intra prediction modes increase to 35, including planar mode, DC mode, and 33 directional modes. This CU/PU/TU concept and 35 prediction modes enable larger design space exploration than H.264 but greatly increase computational complexity of intra encoding. Delays associated with accommodating this increased complexity are particularly problematic for real-time HEVC applications such as live television, drone or autonomous vehicle control, and security imaging.

The CTU partition and prediction mode are determined through rate-distortion optimization (RDO), which outputs the best trade-off between image distortion and compression ratio. In time-constrained, high-resolution video applications, RDO in software implementation cannot sustain the required high throughput and hardware implementation is thus the only practical approach. An RDO hardware architecture performs distortion computation and rate estimation. Distortion computation is made through a series of computationally intensive steps such as prediction, transform, quantization, inverse quantization, inverse transform, and reconstruction. These steps require many hardware resources and it is challenging to design efficient hardware architectures for low-complexity cost-effective distortion computation. On the other hand, rate estimation requires less computational effort, but is extremely time-consuming. The adopted rate estimation algorithm in HEVC reference software is based on context-adaptive binary arithmetic coding (CABAC), which is a highly dependent and serial process. Because of the inherent dependency of context models between bins (output of binarizer), bit rate estimation of syntax elements is very slow.

Existing Hardware Architectures for Rate Estimation

CABAC is important for entropy coding in HEVC because of its coding performance. The traditional sequential dependency of bin processing in hardware architectures of traditional CABAC based rate estimators, however, leads to extremely long computation times and low throughput in existing technologies. In the context of HEVC, long computation time is compared with real-time video encoding. On the assumption that 60 frames per second is real time video encoding, a long computation time is more than 16.6 milli-seconds. Tu et. al, "Efficient rate-distortion estimation for H.264/AVC coders". *IEEE Trans. Circuits Syst. Video Technol.,* 16 (5), (2006) assume Laplacian probability distribution of transformed residuals and accordingly approximate bit rate by counting non-zero coefficients after the quantization step. However, this assumption is not precise in large CU or TU blocks. Other rate estimation models developed for low computational complexity are based on the magnitude of non-zero coefficients. These models, which are developed from test videos, require a preprocessing stage to perform statistical analysis and curve fitting. Such data-driven statistical rate estimation cannot guarantee accuracy of bit rate estimation for any given video file, however. Bin counting after binarization has been proposed for rate estimation by Pastuszak and Abramowski, "Algorithm and architecture design of the H.265/HEVC intra encoder," *IEEE Trans. Circuits Syst. Video Technol.* 26 (1), (2016), where the entropy coding process is replaced by counting the number of bins. Bin counting and statistical rate estimation methods simplify the rate computation process to reduce hardware resource costs, but result in moderate quality losses. Tsai et. al., "A 1062 Mpixels/s 8192×4320p high efficiency video coding (H.265) encoder chip," *Proc. Symp. VLSI Circuits,* (2013) present a table-based context-fixed binary arithmetic coding (CFBAC) bit counting hardware architecture featuring fixed syntax states that allow for multiple CFBAC rate estimation instances to be parallelized without the conflict risk of context modeling. These instances share the same context state memory to reduce hardware cost. This CFBAC based rate estimation algorithm disables the context model update to reduce hardware complexity as compared to CABAC based rate estimation architecture, but leads to 1.14% BD-Rate increase.

The best rate estimation algorithm to date is table-based CABAC bit estimation as described by Bossen, "CE1:

table-based bit estimation for CABAC," *Joint Collab. Team Video Coding* JCTVC-G763, (2011), which has been adopted in HEVC reference software. High-throughput hardware architectures are more difficult to parallelize for high-resolution applications. In order to improve the throughput of CABAC-based rate estimator, Huang et. al., "Fast algorithms and VLSI architecture design for HEVC intra-mode decision," *J. Real-Time Image Process.*, 12 (2), (2015) proposed to process two syntax elements (coeff_abs_level_greater1_flag and sig_coeff_flag) in parallel, while the other 14 syntax elements are processed serially.

ABBREVIATION LIST

ASIC Application-Specific Integrated Circuit
CABAC Context-Adaptive Binary Arithmetic Coding
CP Coefficients Processor
CTU Coding Tree Unit
CU Coding Unit
DC Direct Component
DCT Discrete Cosine Transform
DST Discrete Sine Transform
GA-GE Group A—Group E
FPGA Field Programmable Gate Array
HEVC High Efficiency Video Coding
MD Mode Decision
PSNR Peak Signal to Noise Ratio
PU Prediction Unit
QP Quantization Parameter
RD Rate Distortion
RDO Rate Distortion Optimization
TU Transform Unit
UHD Ultra-High-Definition

SUMMARY OF THE INVENTION

A preferred embodiment provides a method for estimating bit rate in a high efficiency video encoder encoding for a high efficiency video coding standard. Syntax elements of the high efficiency video coding standard are separated into a plurality of independent groups of related syntax elements. Local context tables are assigned to at least some of the groups of related syntax elements. A latest global context model is loaded into at least two of the local context tables. Binarization and rate estimation of bins is simultaneously and independently conducted, derived according to local context table bin values. A look-up table of fractional rate is updated. Group bit numbers from the independent groups are passed to a fractional rate accumulator to determine a total bit rate. Preferably, a new round of the simultaneously and independently conducting binarization and rate estimation is commenced when a main controller of the video encoder is idle. The separating of groups can include sorting syntax elements for luma rate estimation into the plurality of independent groups. Preferably, the global context model is maintained in a global context model buffer and the local context tables are loaded such that candidate prediction blocks of a same prediction model share the same initial context models that have been stored in the global context model buffer. The maintaining is conducted to the global context model buffer to ensure that each prediction block has the correct initial context model values and no global context model will be updated before mode decision is being made Preferred methods provide bit estimation in an encoder that complies with the H.265 standard.

A preferred embodiment high-throughput CABAC bit rate estimator in a high efficiency video encoder encoding for a high efficiency video coding standard includes a plurality of independent table registers that each receive a separate and independent group of syntax elements. A rate estimator instance is provided for each of the plurality of independent table registers, wherein each rate estimator instance simultaneously and independently carries out binarization and rate estimation according to local context models in the independent table registers. A global register of context models is used to update the local context models. A fractional rate accumulator accumulates fractional rates from each of the rate estimator instances. The estimator preferably includes a coefficients loading controller configured to fetch a portion of a plurality of inputs and pass the plurality of inputs to a coefficients processor, and the coefficients processor is configured to generate a plurality of the syntax elements to store in independent syntax group registers.

BRIEF DESCRIPTION OF THE DRAWINGS

FIG. 7A shows a block diagram of rate estimating "coeff_abs_level_remaining" in syntax group E for an embodiment where R=5.

FIG. 7B shows a block diagram of kth order truncated Rice coding.

FIG. 7C shows a block diagram of (k+1)-th order Exp-Golomb coding.

DETAILED DESCRIPTION

Figures 1A, 1B:
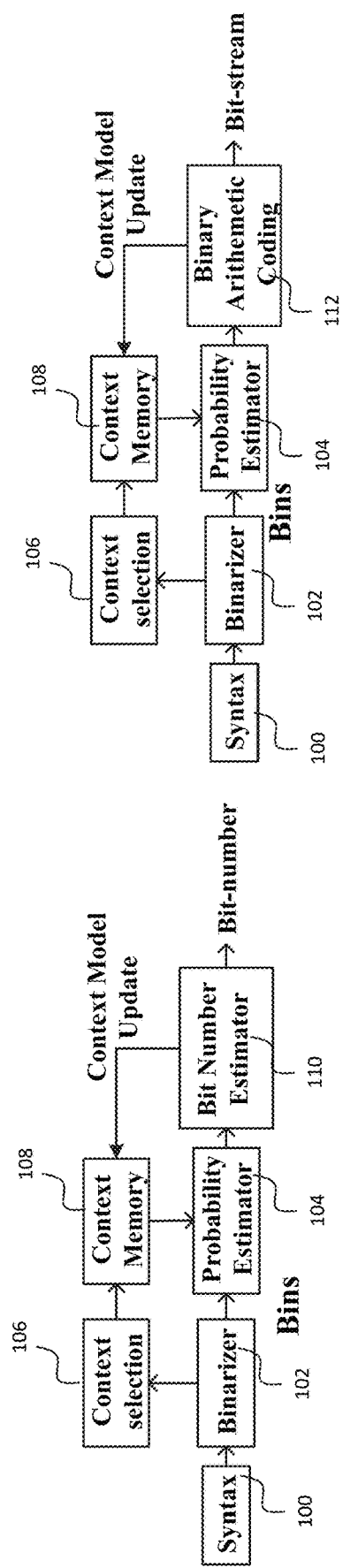
FIG. 1A shows a computational diagram for a table-based CABAC bit rate estimator in accordance with the invention that helps RDO determine the best option for prediction modes and size partitions.
FIG. 1B shows a computational diagram of a conventional table-based CABAC bit stream encoder that uses binary arithmetic coding to generate a bit stream.

Existing hardware architectures and approaches do not effectively solve the challenge of high-throughput implementation of table-based CABAC rate estimation. The invention addresses that failure and provides a highly-parallel hardware architecture and coding methods for table-based CABAC bit estimation to achieve high estimation accuracy and throughput.

The present invention addresses the problem of slow, traditionally serial bit rate estimation calculations by implementing a highly parallel hardware architecture for table-based CABAC bit rate estimation. All related syntax elements are classified into R independent groups that are processed in parallel, where R is preferably five and the architecture preferably supports rate estimation from CU 8×8 to 64×64. R=5 provides optimal performance, but reasonable performance can be obtained for R values from 2 to 8. A preferred architecture is implemented via a field programmable gate array (FPGA) or application-specific integrated circuit (ASIC). While R is chosen as 5, the value can be any positive integer value. R=5 is preferred as the best trade-off between encoding throughput (i.e., an important metric for encoding performance) and hardware complexity (i.e., hardware implementation area and time). Generally speaking, if the value is larger, the encoding throughput is higher, but the hardware complexity is increasing. If the value is smaller, the encoding throughput is lower, but the hardware complexity is less Artisans will appreciate many advantages of the present architectures and methods. The present rate estimation method and architecture has three important benefits that the inventors wish to enumerate.

First, table-based CABAC rate estimation provides reliable, consistent, and accurate rate prediction because it follows the essential computation of CABAC bit stream encoders. Entropy coding is a lossless compression scheme that uses statistical properties to compress data such that the number of bits used to represent the data is logarithmically proportional to the probability of the data. As CABAC inherently targets high coding efficiency, it is the only entropy coding adopted and thus the only choice for bit stream generation in the HEVC standard. As discussed above, the CABAC bit rate estimator and CABAC bit stream encoder in principle conduct the same binarization and context-adaptive probability modeling. A CABAC bit rate estimator accumulates the fractional bit of each bin to provide the total number of bits, while a CABAC encoder performs binary arithmetic coding to generate the bit stream for a coded video. Existing designs do not employ context-adaptive probability modeling for bit rate estimation, however. There is thus an inevitable discrepancy in predicted rate when non-CABAC based bit rate estimators are adopted in an HEVC intra encoder. The present CABAC rate estimator matches the context-adaptive probability modeling with the CABAC bit stream encoder, naturally ensuring reliable, consistent, and accurate rate prediction.

Second, the present method and architecture does not require rate model preprocessing. In practice, the rate estimation accuracy for designs that require preprocessing may vary widely depending on video contents. In contrast, the present CABAC rate estimator fully conforms to the computational theory and procedure of CABAC bit estimation (i.e., binarization and context-adaptive probability modeling), so good rate estimation accuracy can be ensured with limited change in accuracy for different video contents. This increases user convenience.

Third, the present hardware architecture is highly efficient and enables high-throughput rate prediction. Table-based CABAC algorithms are generally time-consuming due to context dependency between coding bins and syntax elements. In order to accelerate context-adaptive rate estimation for high throughput, two kinds of parallelisms are employed in a preferred embodiment hardware architecture: i) R (where R is preferably between two and eight and most preferably five) independent syntax groups are established and processed simultaneously and ii) each instance of rate estimator is assigned to a specific RDO candidate of a PU. Thus, multiple RDO candidates are processed in parallel through multiple instances of rate estimator. Furthermore, the preferred architecture is flexible to tradeoffs in hardware cost and rate prediction throughput, which can be adjusted via the instance number. TABLE 1 compares a preferred hardware implementation to existing solutions, illustrating that the present invention supports ultra-high definition video encoding (e.g., 3840×2160 @ 30 fps) with better rate estimation accuracy than any existing architecture.

TABLE 1

Comparison of rate estimator hardware designs.

| Hardware Architecture | Johar and Alwani, *Proc. IEEE Consum. Commun. Netw.*, 2013 | Zhu et. al., *Proc. 19th ASP-DAC*, 2014 | Pastuszak and Abramowski, *IEEE Trans. Circuits Syst. Video Technol.* 26 (1), 2016 | Tsai et. al., *Proc. Symp. VLSI Circuits*, 2013 | Huang et. al., *J. Real-Time Image Process.*, 12 (2), 2015 | Present Invention |
|---|---|---|---|---|---|---|
| Rate Estimation Algorithm | Magnitude of non-zero coefficients | Binary classification of N × N quantized coefficients | Bin counting | CFBAC | Parallelized CABAC context adaption | Highly-parallel CABAC without the syntax "split_cu_flag" |
| Rate model preprocessing | Required | Required | Required | No need | No need | No need |
| Video Test Sequences | 8 in class A-C | 21 in Class A-E | 24 in Class A-E, 4K | N/A | Class A-F | 21 in Class A-E |
| Technology | N/A | TSMC 90 nm | TSMC 90 nm | TSMC 28 nm | SMIC 55 nm | TSMC 90 nm |
| Area (k gate) | N/A | N/A | 53.1 | 56.8 (for binarization) + 120.4 for (CFBAC Rate estimator) | N/A | 197 (for 13 rate estimator instances) |
| Power (mW) | N/A | N/A | 13.3 | N/A | N/A | 76 |
| Frequency (MHz) | N/A | 357 | 200 (for main reconstruction loop) 400 (for 4 × 4 | 312 | 294 | 320 |

TABLE 1-continued

Comparison of rate estimator hardware designs.

| Hardware Architecture | Johar and Alwani, Proc. IEEE Consum. Commun. Netw., 2013 | Zhu et. al., Proc. 19th ASP-DAC, 2014 | Pastuszak and Abramowski, IEEE Trans. Circuits Syst. Video Technol. 26 (1), 2016 | Tsai et. al., Proc. Symp. VLSI Circuits, 2013 | Huang et. al., J. Real-Time Image Process., 12 (2), 2015 | Present Invention |
|---|---|---|---|---|---|---|
| Supported CU/PU sizes | N/A | 4 × 4~32 × 32 PU 8 × 8~32 × 32 CU | 8 × 8~32 × 32 CU (reconstruction loop) | 16 × 16~64 × 64 CU | 4 × 4~32 × 32 PU 8 × 8~32 × 32 CU | 4 × 4~64 × 64 PU 8 × 8~64 × 64 CU |
| Relationship among clock cycles, QP, CU size, PSNR | No | No | No | No | No | Yes, in table V |
| Rate estimation performance | Low BD-Rate [6.27%] BD-PSNR [−0.26 dB] | Low BD-Rate [4.53%] BD-PSNR [−0.20 dB] | Low BD-Rate [2.11%] BD-PSNR [−0.091 dB] | Medium BD-Rate [1.1%] BD-PSNR [N/A dB] | Medium BD-Rate [0.5%] BD-PSNR [N/A dB] | High BD-Rate [−0.005%] BD-PSNR [0.0092 dB] |
| Encoder throughput with the specific rate estimator | N/A | 1920 × 1080 @44 fps | 3840 × 2160 @30 fps | 8192 × 3420 @30 fps | 1920 × 1080 @60 fps | 3840 × 2160 @30 fps |

Preferred embodiments provide three important features (1) A highly-parallel hardware architecture of table-based CABAC bit rate estimation. All related syntax elements are classified into R, where R is preferably between two and eight and most preferably five, independent processing groups. Five groups is preferred to provide the best trade-off between processing throughput and design complexity. These R groups can be parallelized (and optionally pipelined) to estimate bit rates and accelerate syntax element processing. (2) An efficient design methodology, including considerations, details of primary building blocks, syntax processing order, and system timing. (3) The preferred architecture is fully compatible with the table-based context-adaptive binary arithmetic coding (CABAC) bit rate estimation algorithm with one exception; namely, the syntax element "split_cu_flag" is ignored. The preferred design has been realized and validated in HM-15.0 reference software, where it illustrated improved video compression and quality (i.e., 0.005% in BD-Rate and 0.0092 dB in BD-PSNR). The reduced hardware complexity achieved by ignoring "split_cu_flag" thus results in minimal performance tradeoff and is thus advantageous.

A preferred embodiment architecture has been implemented in FPGAs and ASICs. Relationships among quantization parameter (QP) values, peak signal-to-noise ratio (PSNRs), CU sizes, and the number of required clock cycles for rate estimation have been explored. Compared with existing hardware architectures for rate estimation, the preferred architecture demonstrates significant advantages in rate estimation accuracy and reliability.

Preferred Highly-Parallel Hardware Design

Design Methodology

With reference to FIGS. 1A and 1B, syntax 100 is from the earlier stages of prediction and quantization. A binarizer 102 converts syntax elements into bins. A probability estimator 104 provides the probability of each bin. Context selection 106 selects context models of each bin from the context memory 108. Context memory 108 is updated and provides new context models to the probability estimator 104.

The table-based CABAC bit rate estimator of the invention (FIG. 1A) and the prior CABAC bit stream encoder (FIG. 1B) in principle, conduct the same binarization and context-adaptive probability modeling. However, the present CABAC bit rate estimator (FIG. 1A) accumulates the fractional bit of each bin to provide the total number of bits, while the conventional CABAC encoder performs binary arithmetic coding to generate a bit stream for coded video. Instead of generating a bit stream, the present CABAC bit rate estimator (FIG. 1A) only helps an RDO determine the best option for prediction modes and partitions. As shown by comparing FIG. 1A to FIG. 1B, a preferred table-based CABAC bit rate estimator 110 does not require a CABAC bit stream encoder architecture as used in FIG. 1B, since the bit estimator 110 only conducts binarization and context-adaptive probability modeling. The CABAC bit rate estimator 110 accumulates the fractional bit of each bin to provide the total number of bits. In contrast, CABAC bit stream encoder performs binary arithmetic coding 112 to generate a bit stream for coded video in FIG. 1B. Instead of generating a bit stream, the CABAC bit rate estimator 110 only helps RDO (not shown in FIG. 1A) determine the best option for prediction modes and size partitions.

Accordingly, preferred embodiments can process syntax elements in a flexible order during rate estimation. The bit rate estimation of bins that require different context models can be parallelized for high throughput. A CABAC-based rate estimation process is time consuming, but the present invention enables the process to parallelize multiple groups of syntax elements and process the CABAC-based rate estimation with more hardware resources. The architecture is capable of providing a substantial performance improvement in rate estimation accuracy and throughput All syntax elements can be processed in a flexible order for rate estimation, and estimation of bins that require different context models can be parallelized for high throughput. Syntax elements are divided into groups, preferably with the syntax elements in each group being independent of the syntax elements in another group to avoid interdependencies between syntax elements in different groups. The present invention parallelizes multiple groups of syntax elements with one or more hardware resources to speed CABAC-based rate estimation. As a result, the present architecture achieves substantial performance improvement in rate estimation accuracy and throughput. TABLE 2 shows the 16 syntax elements are classified into five independent groups (R=5) in the preferred embodiment and the total number of context models is 84. Each syntax group can be processed individually and simultaneously and sequential dependency among different groups is eliminated.

TABLE 2

Group-based syntax element division.

| Group | Syntax Elements for Luma Rate Estimation | Number of Context Models |
|---|---|---|
| A | prev_intra_luma_pred_flag | 1 |
|   | mpm_idx | 0 |
|   | rem_intra_luma_pred_mode | 0 |
|   | part_mode | 1 |
|   | cbf_luma | 2 |
|   | transform_skip_flag | 1 |
| B | last_sig_coeff_x_prefix | 15 |
|   | last_sig_coeff_y_prefix | 15 |
|   | last_sig_coeff_x_suffix | 0 |
|   | last_sig_coeff_y_suffix | 0 |
| C | coeff_abs_level_greater1_flag | 16 |
|   | coeff_abs_level_greater2_flag | 4 |
|   | coded_sub_block_flag | 2 |
| D | sig_coeff_flag | 27 |
| E | coeff_sign_flag | 0 |
|   | coeff_abs_level_remaining | 0 |
| Total | 16 syntax elements | 84 |

In addition to establishing R (preferably five) independent syntax groups inside a rate estimator of FIG. 1, the preferred highly-parallel rate estimation architecture implements multiple rate estimator instances to increase parallelism. Each instance is assigned to estimate the rate of a candidate prediction block of a PU, which contains multiple mode candidates for RDO. All candidate prediction blocks of the same PU share the same initial context models that have been stored in the global context model buffer. The global context model buffer ensures that each prediction block has the correct initial context model values and no global context model will be updated before mode decision is being made.

One risk that arises from using multiple parallel rate estimator instances is context model update conflict due to sharing of global context models among multiple instances. Inappropriate timing control of context model loading and updating could produce errors that prevent a coding output. The present invention avoids the unpredictable result of a functional highly parallel rate estimator by implementing a procedure of context model table loading and updating shown in FIG. 2. There are 1-N rate estimate instances 2001-200N. Before starting rate estimation, all instances 2001-200N load the latest global context models from the table for global context models 202 into their internal register array 204 as the local context models. The latest model comes from the table 202. This operation is called "context model localization." Then, during rate estimation, local context models inside each instance are updated accordingly while the global context models remain unchanged. Since each rate estimation instance has its own local context model buffer 204 for each group of syntax elements, the conflicts of context modeling between different instances are avoided. Once rate estimation is complete in all instances, the RD mode decision 208 is made. Based on the model decision result 208, the latest local context models in a rate estimation instance with less RD cost are selected 210 to update the new global context models in the table 202. These preferred procedures of context model table loading and updating prevent potential context model conflict among multiple rate estimator instances.

Preferred Hardware Architecture

Figure 3:
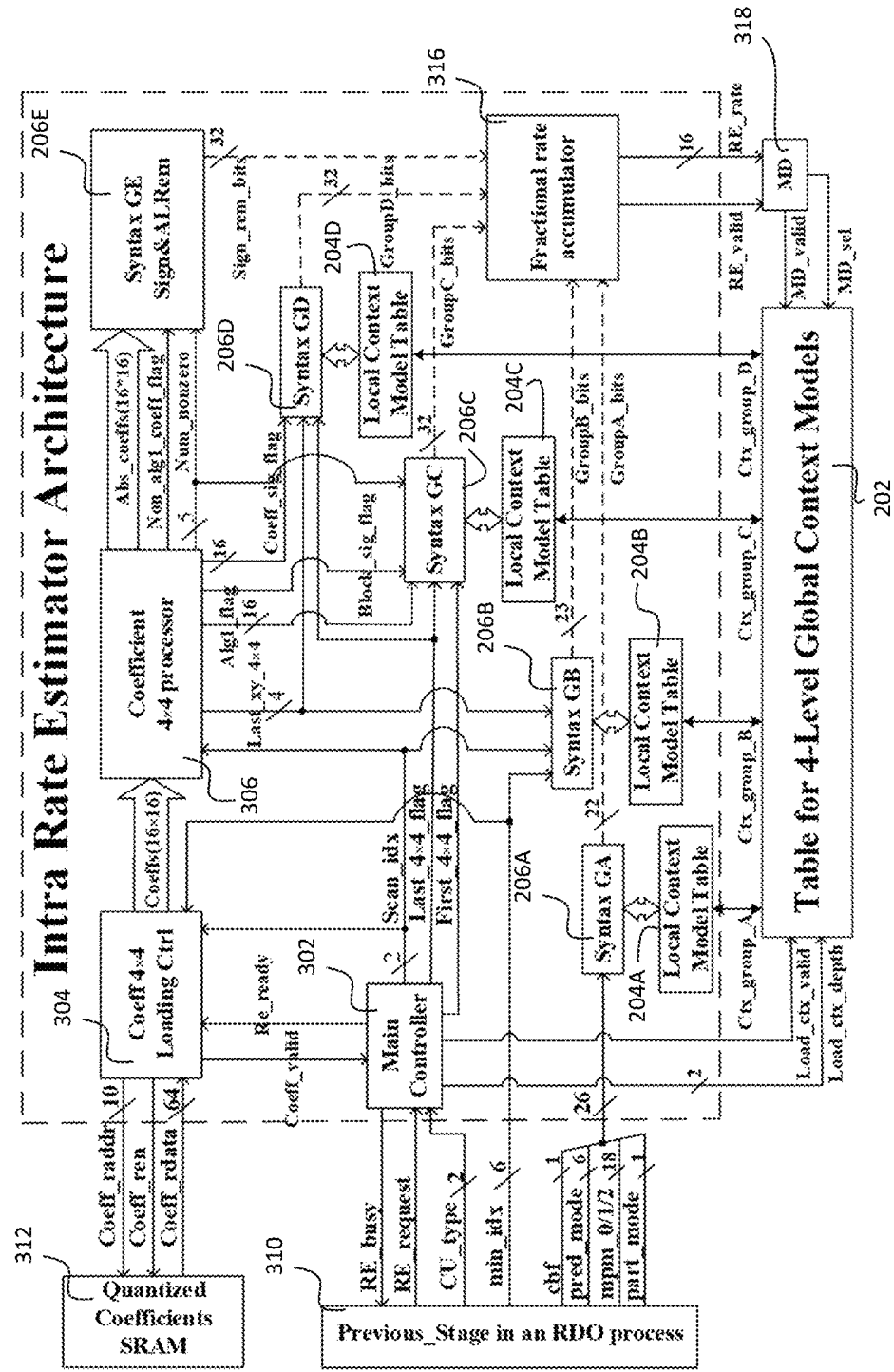
FIG. 3 shows a schematic overview of preferred highly-parallel hardware architecture of FIG. 1A for table-based CABAC bit rate estimation.

FIG. 3 depicts a preferred highly-parallel hardware architecture for a table-based CABAC bit rate estimator for an embodiment where R=5, and the output is RE_rate. The FIG. 3 architecture is preferably implemented in a single chip, and all features of FIG. 3 are "on-chip". The architecture includes a main controller 302, coefficients loading controller 304, coefficients processor (CP) 306, fractional rate accumulator, and five independent syntax groups (GA-GE) 308A-308E. Group A contains prediction information related syntax elements. Group B includes last significant coefficient position related syntax elements.

Elements "coeff_abs_level_greater1_flag", "coeff_abs_level_greater2_flag" and "coded_sub_block_flag" are contained in Group C. Group D includes "sig_coeff_flag". Group E only contains bypass coded related syntax elements.

A previous stage 310 in an RDO process monitors the status of the main controller 302. Once the main controller 302 is idle, a new round of rate estimation is triggered. Input signals are imported from the previous stage including quantized coefficients 312 and the prediction information of the coming CU. Table-based CABAC rate estimation is performed in a form of 4×4 sub-block, which contains 16 16-bit-width coefficients. A flexible number of coefficients (e.g., 4, 8, 16) can be loaded per clock cycle. Four clock cycles are needed to fetch such a sub-block, since the coefficient loading controller 304 reads 4 coefficients per clock cycle from an on-chip 64-bit-width static random access memory (SRAM) 312. FIFO (first-in-first-out) registers are preferred to store the loaded coefficients in the loading controller 304. Upon completion of the sub-block loading, all 16 coefficients are processed by the coefficient processor (CP) 306. Syntax elements and related control variables (such as "Non-agl_coeff_flag", "alg1_flag") are generated in this coefficient processor 306. Instead of sending out to other blocks, these syntax elements are only used locally in 206A-206E. Once receiving the signals from 310, Syntax GA 206A is able to work and generates its syntax elements. 206B-206E needs to get coefficient processing from 306, then, 206B-206E will work and generate their syntax elements. This is permitted because the group syntax elements are selected to be independent of each other. All syntax elements in TABLE 2 are classified into five independent groups. Then, these five syntax groups GA-GE 206A-206E simultaneously and independently carry out binarization, rate estimation of derived bins according to context models, bin values and update the look-up table of fractional rate in a fractional rate accumulator 316. The group bit numbers from these five syntax groups are passed to the fractional rate accumulator 316 to produce the total bit rate. When the total bit rate is available, the control signals "RE_valid" and "RE_rate" notify a mode decision (MD) module 318. Based on the "MD_sel" signal, a table for global context models 210 is updated. Loading of local context model tables 204A-204E is conducted as described with respect to FIG. 2. The tables contain global context models for 4 different sizes of CU (coding unit) blocks (i.e., 8×8, 16×16, 32×32, and 64×64). The preferred embodiment uses 4-level table, so each level stores a specific block size. In this way, it is no conflicts will occur during model download and update. The difference is the computation process of new syntax values in Groups A-D needs to know the current syntax values, so local context model tables are used to store its current values. The computation process of the new syntax values from Group E does need to know its current value, so its new value is directly computed without using local context model table.

Figure 2:
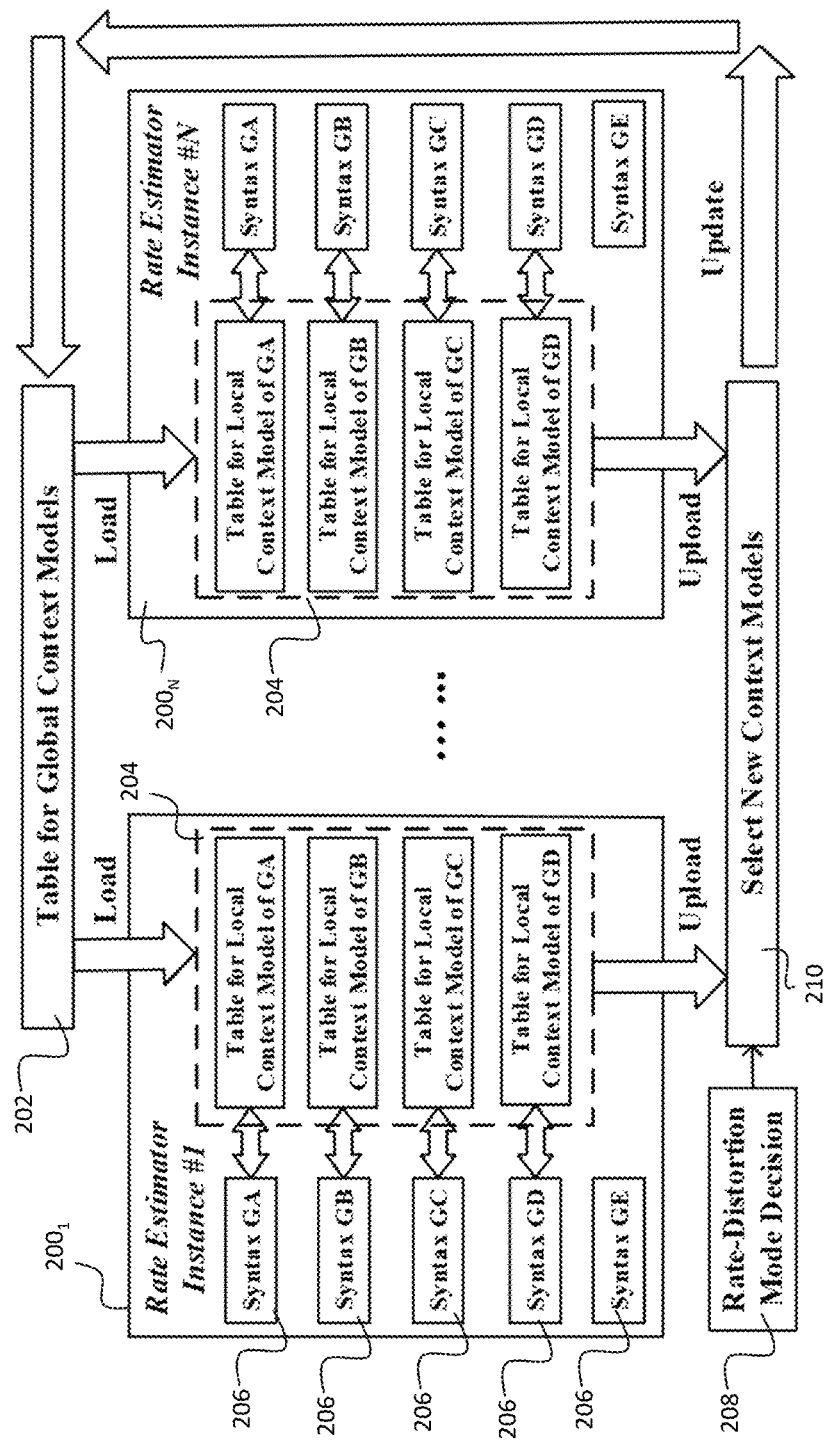
FIG. 2 shows a preferred procedure for context model table loading and updating.

The preferred hardware architecture of FIGS. 2 and 3 supports rate estimation of all CU sizes from 64×64 to 8×8 and all TU sizes from 32×32 to 4×4. The PU size is equal to CU size, except for 8×8 CUs that are associated with either 8×8 PUs or four 4×4 PUs. The TU size is equal to PU size, except for 64×64 PUs that utilize four 32×32 TUs. Rate estimation of a CU is estimated according to its TUs. If a CU contains multiple TUs, such as an 8×8 CU with a partition mode N×N, the results of four sub-TUs are added as the total rate of this CU. Rate estimation of a TU is performed on the basis of 4×4 sub-blocks according to its scan direction.

The preferred architecture does not widely leverage pipelining to optimize hardware throughput due to two reasons. First, unlike existing coefficients-based or bin-counting-based rate estimators that purely rely on combinational logic gates to estimate rate, the present table-based CABAC rate estimator calculates rate values mainly via look-up tables (LUTs) of syntax contexts. In order to maximize throughput in a rate estimator of the invention, syntax elements are classified into R, where R is preferably five, isolated groups for parallel processing. The critical path involves three steps (i.e., context modeling, LUT access, and context model updating). In preferred methods, adjacent bins often rely on the same context model for rate estimation. Thus, in order to process one bin per cycle and to avoid context conflicts, context models should be used and updated within one clock cycle. Even though a pipelined design helps to shorten the critical path, it also leads to potential conflicts of context models between adjacent bins and causes inaccuracy in rate estimation. Second, synthesis results presented below show that the present non-pipelined hardware implementation already runs at a clock frequency of 320 MHz, which is enough to process a video format of 3840×2160 @ 30 fps. Since the non-pipelined design meets the system requirement, there is no need to apply the pipeline technique to further improve the throughput. Pipelining could be added without any conflict. However, the use of pipelining will not significantly improve the encoding throughput, and would add unnecessary design complexity.

Note that the syntax element "split_cu_flag" is defined in CABAC algorithm. The bit rate of this flag is estimated when four sub-CUs compare with a larger CU in the same region. If four sub-CUs are chosen, this syntax element is 1. Otherwise, it is 0. This syntax element is not involved in rate-distortion comparison among various prediction modes of a given CU size. The proposed architecture intentionally omits this syntax element to reduce design complexity and hardware cost. This choice is validated by the experimental results presented herein.

Input Signals and Interface

Input signals ("CU_type", "min_idx", "cbf", "pred_mode", "mpm_0/1/2" and "part_mode") are obtained from the previous stage in an RDO process. "CU_type" indicates current CU size. "min_idx" and "cbf" are generated after the quantization step. "min_idx" is the index of last 4×4 block, which contains non-zero coefficients according to its sub-block scanning method. "cbf" (coded block flag) indicates whether the current TU contains non-zero coefficients or not. "pred_mode" indicates the prediction mode of current PU. "mpm_0/1/2" indicates the most probable modes (MPMs) derived from neighboring PUs. When a TU is larger than 8×8, only diagonal scan is used. For 8×8 or 4×4 TUs, intra prediction mode determines the scan direction. Specifically, vertical scan is assigned to the prediction modes from 6 to 14. Horizontal scan is assigned to the prediction modes from 22 to 30. Diagonal scan is applied to the other prediction modes.

Figure 4:
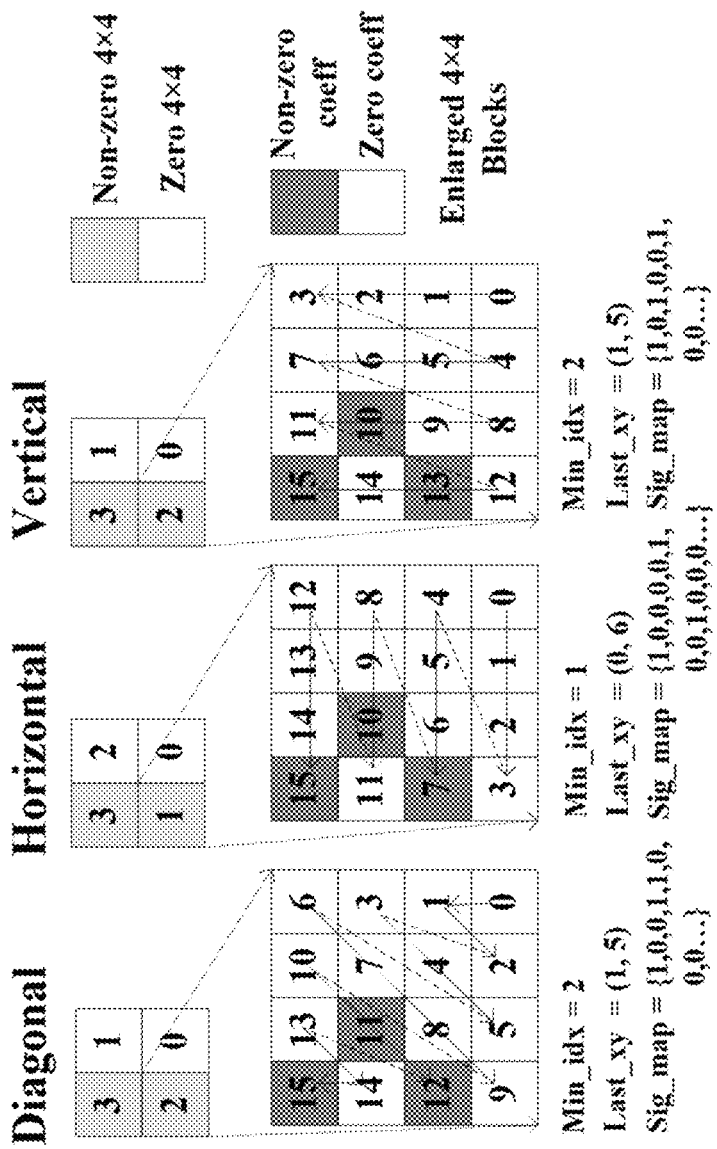
FIG. 4 shows syntax elements derived by three scan methods for an 8×8 TU example.

FIG. 4 illustrates an example of 8×8 TUs, where three scan methods lead to different "min_idx" values. For an 8×8 quantized coefficient matrix, horizontal scanning results in "min_idx"=1, while "min_idx" is 2 for diagonal and vertical scan methods. Since the scanning method causes the coefficients in the last sub-block to be scanned in different orders, the position of the last significant non-zero coefficient is not identical as depicted in FIG. 4. For example, the last coefficient that corresponds to index 11 in a diagonal scanning, while it corresponds to index 7 in a horizontal scanning. As a result, significance maps that contain these non-zero coefficients along the scanning path are different. Since this 8×8 TU in FIG. 4 contains non-zero coefficients, in this example, the value of "cbf" is 1. Otherwise, zero value of "cbf" indicates that only syntax group A is required for coding.

Coefficient Loading and Processing

Figure 5:
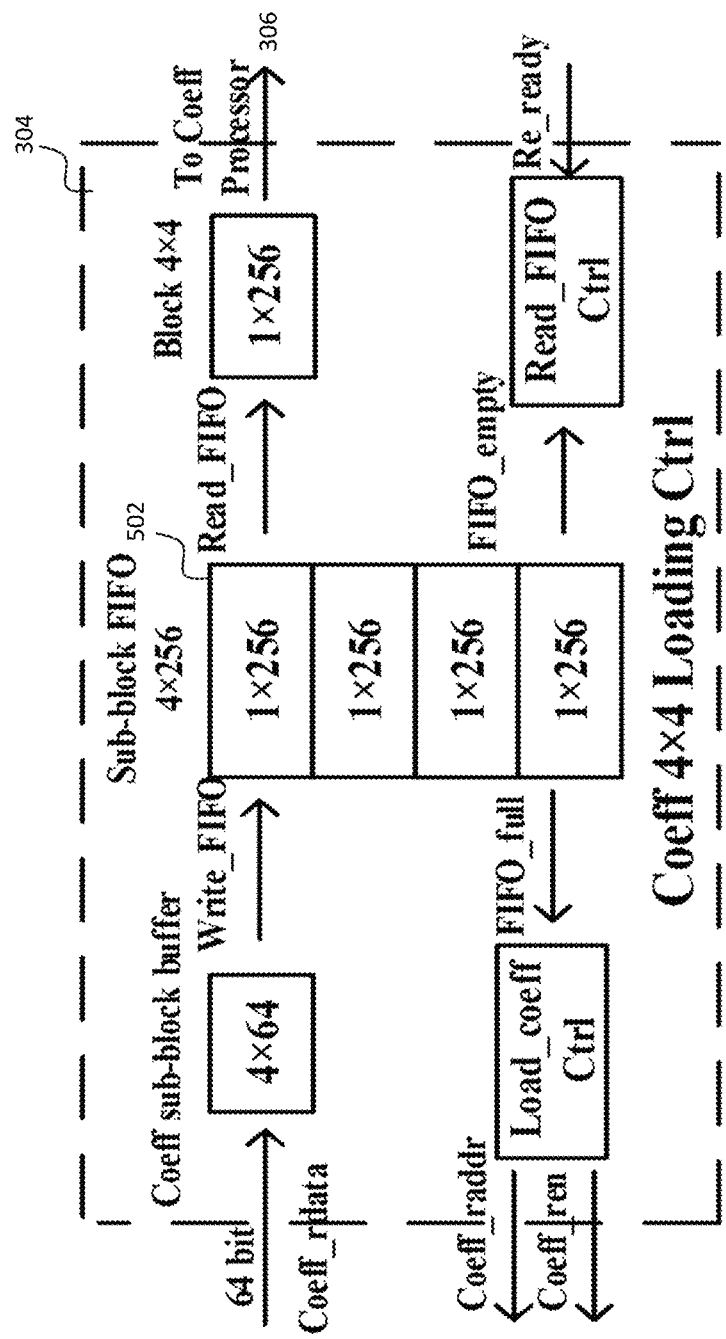
FIG. 5 shows a block diagram of a preferred coefficients 4×4 loading controller.

Performance is affected by the approach of loading and processing quantized coefficients. FIG. 5 shows the preferred FIG. 3 coefficients 4×4 loading controller 304, which is the interface with the quantized coefficients SRAM 312. The function of this block is to fetch 4×4 data from the memory (i.e., Quantized Coefficients SRAM 312) and provide the fetched data to the coefficient 4×4 processor 306. In FIG. 5, a FIFO sub-block buffer 502 (size 4×256) is implemented to store four sub-blocks to eliminate the latency caused by coefficient loading between processing two adjacent 4×4 sub-blocks. Due to the use of the FIFO 502, regardless of the status of rate estimator, loading of 4×4 sub-blocks from quantized coefficients SRAM 312 will not stop until the FIFO 502 is full. In addition, as long as the FIFO 502 is not empty, the coefficient 4×4 processor 306 can fetch and process 16 coefficients of one 4×4 sub-block from this FIFO 502. As a result, the initial latency of coefficient process for the first 4×4 sub-block is six clock cycles (i.e., four for SRAM reading access, one for FIFO writing access, and one for FIFO reading access). Yet, this latency is only one clock cycle (i.e., FIFO reading access) for subsequent sub-blocks. The preferred architecture can use 0.2K byte registers for each rate estimation instance, as compared to 1K byte SRAM for coefficients loading in the design proposed by Pastuszak and Abramowski. See Pastuszak and Abramowski "Algorithm and architecture design of the H.265/HEVC intra encoder," IEEE Transactions on Circuits and Systems for Video Technology (Volume: 26, Issue: 1 (January 2016). In fact, loading quantized coefficients to the coefficient loading controller 304 is independent of passing them to the coefficients processor 306. When the coefficient 4×4 processor sends a "Re_ready" signal to request reading the FIFO 502, if the FIFO 502 is not empty, one 1×256 data will be loaded into the coefficient 4×4 processor 306 during the next clock cycle. Then, syntax elements and related variables start to generate. For example, syntax element "coded_sub_block_flag" is derived by checking "sig_coeff_flag" of these 16 coefficients. "last_x_4×4" and "last_y_4× 4" indicate the scan position of first non-zero coefficient in this 4×4 block. "last_x_4×4", "last_y_4×4" and "min_idx" generate "last_x" and "last_y", which record the scan position of first non-zero coefficient in the current TU. Syntax elements in group B are determined by a binarization scheme of "last_x" and "last_y".

Syntax Group Based Rate Estimation

This section describes how to estimate the fractional rate of each syntax group. In the example embodiment, all related syntax elements are assigned to five independent groups and the total bit rate is thus the sum of five fractional rates (i.e., GroupA_bits, GroupB_bits, GroupC_bits, GroupD_bits and Sign_rem_bits in FIG. 3). The procedure of fractional rate estimation is the same as the table-based CABAC bit rate estimation algorithm in HEVC reference software, including binarization, lookup table based rate estimation for bins, context modeling and updating. The five syntax element groups are processed in parallel without following a defined processing order.

Figure 6:
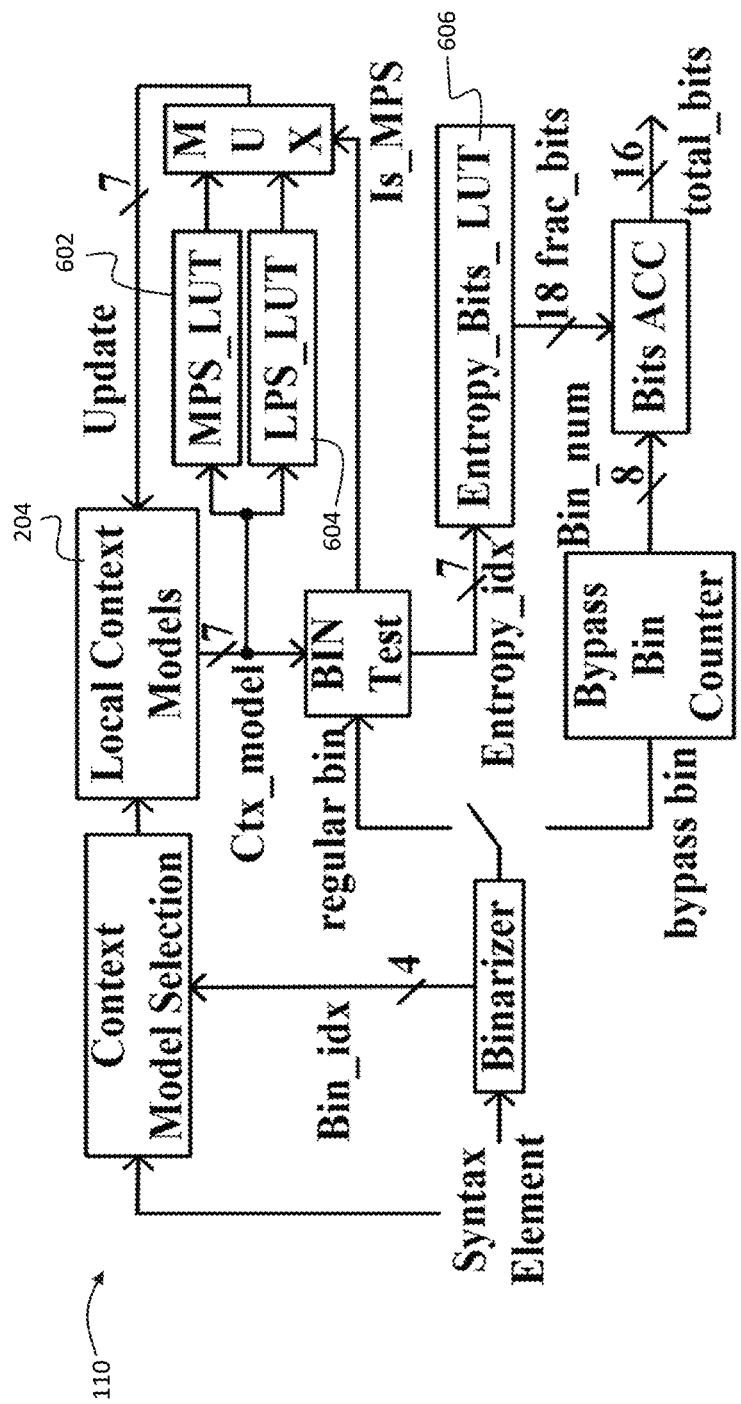
FIG. 6 shows a block diagram of the preferred rate estimator for syntax groups A-D (R=5).

FIG. 6 shows details of 206A-206D in FIG. 3 for syntax groups from A to D in an embodiment where R=5. There are three look-up tables 602, 604 and 606 (i.e., MPS_LUT, LPS_LUT, Entropy_Bits_LUT), and each of them contains 128 storage elements. The predicted most probable symbol (MPS) is stored as the lowest bit of current context model. The value of MPS is compared with the current bin to be coded, and generates a control signal "Is_MPS". Based on "Is_MPS" and the current context model, new context model from either MPS_LUT or LPS_LUT is selected and then updated to the local context models 204. According to the current bin value and its corresponding context model, the fractional rate of this bin is determined through the look-up table Entropy_Bits_LUT. Each fractional rate value is an 18-bit fixed point number, the highest three bits of which represent integer numbers. The number of bypass coded bins exactly represents the rate; therefore, a bypass bin counter is used to calculate bin number. The total rate of a syntax group is accumulated by a Bits_ACC block, which sums all fractional rates of regular bins and bypass bins.

In the example embodiment where R=5, syntax group E comprises two syntax elements, "coeff_sign_flag" and "coeff_abs_level_remaining", which correspond to only bypass coded bins. Therefore, local context models are not required for syntax group E. As bit rate of syntax group E is equal to the number of bins generated by its syntax elements, a bin counter is implemented to calculate the rate of syntax group E. The number of bins for the syntax element "coeff_sign_flag" is calculated by coefficient processor.

Bin counting of the syntax element "coeff_abs_level_remaining" is more critical due to its complex binarization procedure. FIG. 7A shows the block diagram of a preferred rate estimator for "coeff_abs_level_remaining", which involves binarization processes of k-th order truncated Rice coding and (k+1)-th order Exp_Golomb coding. Bit rate estimation of "coeff_abs_level_remaining" starts with the generation of 16-bit signal "remaining_coeff", which is obtained by comparing non-zero absolute coefficients with B0+1. The initial value of parameter B0 is 2, which becomes 1 at the first instance when the absolute coefficient is larger than 1. Then, B0 becomes 0 after processing non-zero coefficients by eight times. If the absolute coefficient is smaller than B0+1, no bypass bin is generated. Otherwise, the bypass bin number of current syntax "coeff_abs_level_remaining" is evaluated based on two arithmetic coding algorithms: k-th order truncated Rice and (k+1)-th order Exp-Golomb. The value of "remaining_coeff" is compared with a constant value 3×2', then a resultant selection signal "sel" is generated for the multiplexer. Binarization result either from k-th order truncated Rice coding or (k+1)-th order Exp-Golomb coding is selected and passed to the rate accumulator. The parameter k is initially set to 0, and later may be updated to the minimum value of k+1 or 4. In FIG. 7A, the bin number estimation takes two clock cycles. "remaining_coeff" and bin number are calculated in the first and second clock cycle, respectively. This two-step process is thus pipelined to achieve a throughput of one coefficient per clock cycle.

FIG. 7B illustrates a preferred block diagram of k-th order truncated Rice coding. "remaining_coeff" is shifted right by k bits, then the lowest two bits are sent to a three-bit adder. Bin number is the output of this adder. FIG. 7C depicts the block diagram of (k+1)-th order Exp-Golomb coding. A 16-bit signal "coded_number" is generated and sent to detect the leading 1. The resultant outputs are two five-bit signals "leading_one_idx" and "rem_allone_flags". Each bit of "rem_allone_flags" is obtained by checking every bit of "coded_number" from the index ("leading_one_idx"−1) to index k. As shown in TABLE 3, "iteration_number" and "rem_allone_flags" depend on k. The total number of bins is based on "iteration_num"×2+4+k.

TABLE 3

Iteration number calculation table.

| "leading_one_idx" | iteration_number |
|---|---|
| <k + 1 | 0 |
| =k + 1 | 1 |
| >k + 1 | depends on "rem allone flags" |

Syntax Processing Order and Timing Diagram

Figure 8:
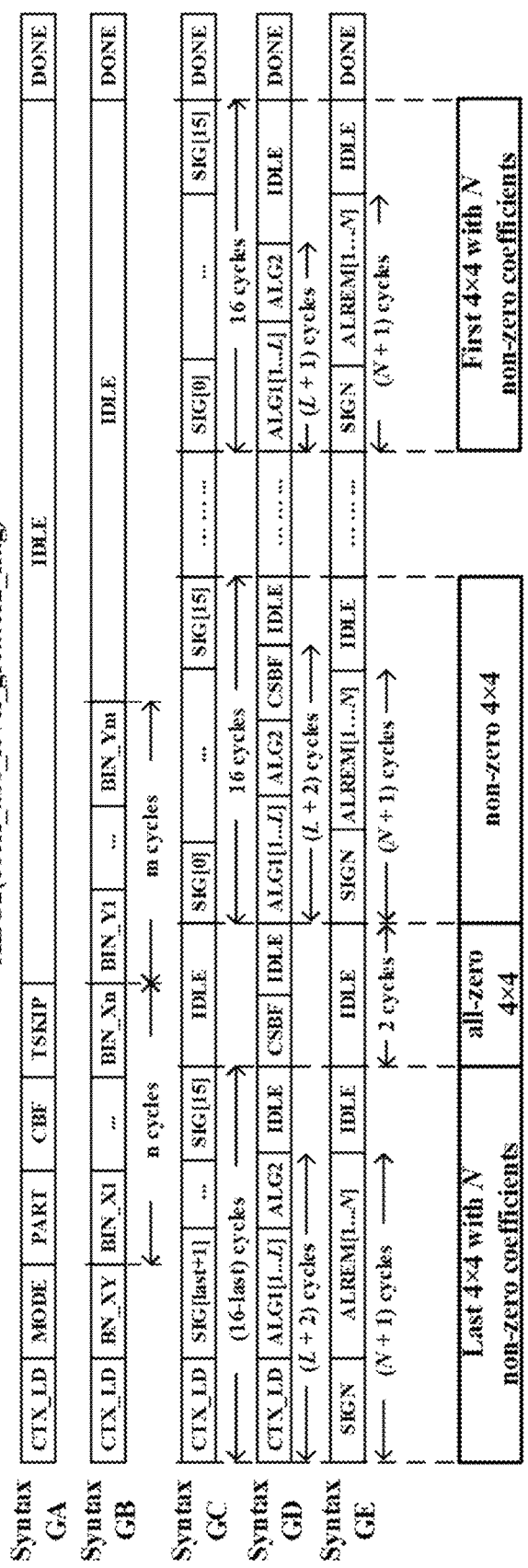
FIG. 8 shows a syntax processing order and timing diagram of five syntax groups in the proposed rate estimator for an embodiment where R=5.

FIG. 8 illustrates the syntax processing order and the timing diagram of five syntax element groups in the preferred rate estimator where R=5. Processing of syntax group A and B is performed once for each TU, while processing of syntax group C to E is triggered according to 4×4 sub-block as shown in FIG. 8. Context model loading (CTX_LD) is performed at the beginning for CU rate estimation. Due to a large number of context models and limited SRAM access bandwidth, many clock cycles are required to load context models from SRAMs and update context models back to SRAMs. Therefore, instead of SRAMs, register arrays are used in 304, 204A-204D in FIG. 3 to reduce the time used for data loading are selected as context model buffers due to their short access time and high bandwidth for enabling parallel data access multiple rate estimator instances. In the preferred design, one clock cycle is enough to load or update these global context models from or to local register arrays. As syntax group E does not rely on context models, its rate estimation starts with the syntax "coeff_sign_flag". The details of syntax processing order and timing diagram are described herein.

In group A, three syntax elements "part_mode", "transform_skip_flag" and "cbf_luma" are regularly coded and contain one bin. "transform_skip_flag" is only for 4×4 TUs in TSKIP process. If "pred_mode" matches one of three MPM modes, "prev_infra_luma_pred_flag" is 1, and "mpm_idx" is equal to the index of matched MPM mode. "prev_infra_luma_pred_flag" is regularly coded in MODE process. "mpm_idx" and "rem_intra_luma_pred_mode" are bypass coded. Binarization of "mpm_idx" is performed by the truncated unary. The fixed-length binarization is applied to "rem_intra_luma_pred_mode". Bin number of "mpm_idx" or "rem_intra_luma_pred_mode" is calculated after binarization. The entire processing time for group A is less than 6 clock cycles.

In syntax group B, binarization process BN_XY of (last_x, last_y) is performed after CTX_LD. The signals "last_x" and "last_y", determined by "min_idx" and "Last_xy_4×4", indicate the position of last non-zero coefficient in a TU. Four syntax elements are derived from "last_x" and "last_y". "last_sig_coeff_x_prefix" and "last_sig_coeff_y_prefix" that specify the prefixes of the column and row positions of the last non-zero coefficient contain regular coded bins, while "last_sig_coeff_x_suffix" and "last_sig_coeff_y_suffix" that specify the suffixes of the column and row positions contain bypass coded bins. Truncated unary binarization is applied to prefix syntax elements, while fixed-length binarization is used for suffix syntax elements. Assume there are n regular bins of syntax "last_sig_coeff_x_prefix" and m regular bins of syntax "last_sig_coeff_y_prefix" in FIG. 8. Then, according to the bin processing order, the total number of required clock cycles is (m+n+2).

Syntax group C contains the regular coded syntax element "sig_coeff_flag". Syntax group D contains regular coded syntax elements "coeff_abs_level_greater1_flag" (ALG1), "coeff_abs_level_greater2_flag" (ALG2), and "coded_sub_block_flag" (CSBF). Syntax group E only contains bypass coded syntax "coeff_sign_flag" and "coeff_abs_level_remaining" (ALRem). FIG. 8 shows four different sub-block cases of rate estimation for groups C-E. In each sub-block, N is defined as the number of non-zero coefficients of current 4×4 block and L is the maximum number of "ALG1" syntax to process. L is set equal to the smaller value of N and 8. Each of the four sub-block cases may be processed differently, as described below.

1) Last 4×4 sub-block: It is the first sub-block to process. In syntax group C, "sig_coeff_flag" of the first non-zero coefficient along the scanning path is ignored. Processing of "sig_coeff_flag" starts from the next scan position. In syntax group D, processing of "ALG2" is performed when there exists an absolute coefficient larger than 1 in this sub-block. If this coefficient is also larger than 2, the bin value of "ALG2" is 1. Processing of the syntax element "coded_sub_block_flag" is ignored for the last sub-block according to CABAC rate estimation algorithm. In syntax group E, processing of "coeff_sign_flag" starts immediately. As "coeff_sign_flag" is bypass coded, the corresponding rate is equal to the number of non-zero coefficients. Each non-zero coefficient is examined by ALREM process, which performs binarization of syntax element "ALRem". The total number of clock cycles required in Group E is determined by the number of non-zero coefficients. N is the required number of bits to compress "coeff_sign_flag". Rate estimation of "ALRem" is carried out as shown in FIG. 8. The required total number of clock cycles is determined by the scan position of the first non-zero coefficient in this block.

2) All-zero 4×4 sub-block: All coefficients in this block are zero. In this case, the only syntax "coded_sub_block_flag" with value 0 is processed within two clock cycles for all groups C-E. It takes two clock cycles to process one all-zero block.

3) Non-zero 4×4 sub-block: This block contains at least one non-zero coefficient. According to the scan order, it is neither the last 4×4 block nor the first 4×4 block. There are in total 16 regular coded bins of syntax "sig_coeff_flag" to process, so it takes 16 clock cycles to process in group C. In group D, the process is almost the same as that in the last 4×4 sub-block, except a value 1 for "coded_sub_block_flag". The number of required clock cycles in group D is determined by L and "ALG2". In group E, the required number of clock cycles is determined by (k+1).

4) First 4×4 sub-block: It is the final sub-block to process. Processing this block is similar to that with the non-zero 4×4 sub-block, except the absence of "coded_sub_block_flag" in group D. The required numbers of clock cycles for group C, D and E are marked in FIG. 8.

After processing the first 4×4 block, DONE is activated to execute two operations: calculating the final rate of current CU or TU by fractional rates of five syntax groups in the fractional rate accumulator 316, and saving newly derived context models in the local register arrays 204. These new context models will be further used to update the table for 4-level global context models 202 after mode decision. When a rate estimator reaches the DONE status, it can be scheduled to process another CU or TU.

RD Cost Mode Decision

Figure 9:
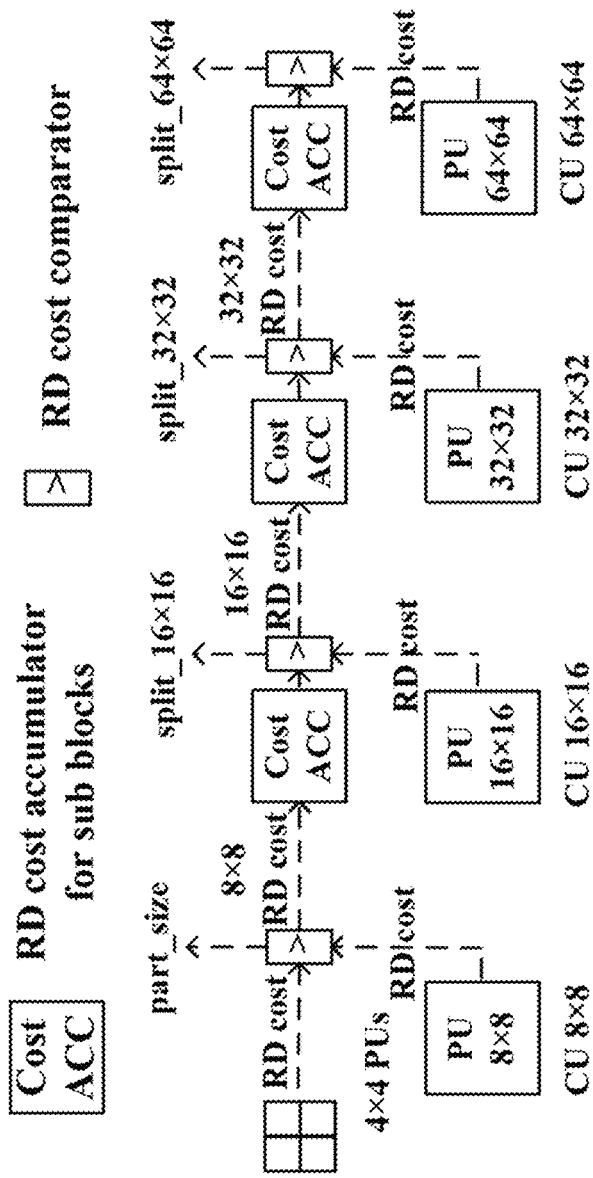
FIG. 9 shows partition mode decision flow through RD cost comparison.

Mode decision in intra prediction involves the choice of best prediction mode & partition for a given CU. FIG. 9 shows a preferred mode decision (MD) module 318 of FIG. 3, where each RD cost accumulator collects the cost of 4 sub-CUs and then compares with the RD cost of current CU. RD cost of the same CU with different PUs are also compared, even though this process is not drawn in FIG. 9. Finally, the smallest RD cost among all possible prediction modes and partitions is taken as the RD cost of this CU.

The RD cost comparison in FIG. 9 generates signals for context model updating, such as "part_size", "split_16×16", "split_32×32", and "split_64×64". These signals are internal to the mode decision (MD) module 318, and not shared with other modules. "part_size" indicates the partition mode of 8×8 CUs. If "part_size" is equal to 1, it means 4×4 PUs have a smaller RD cost than 8×8 PUs and PART_N×N is chosen. "split_16×16" indicates if a 16×16 CU should be split into four 8×8 CUs. "split_32×32" indicates if a 32×32 CU should be split into four 16×16 CUs. "split_64×64" indicates if a 64×64 CU should be split into four 32×32 CUs.

Context Model Updating

The preferred global context model contains four levels. Levels 0, 1, 2 and 3 are dedicated for 8×8, 16×16, 32×32, and 64×64 CUs, respectively. All global context models are stored in the four register arrays 202 instead of in on-chip SRAMs, where each register array saves the context models of a specific CU size. Among the 16 syntax elements in TABLE 2, six contain bypass coded bins and ten contain regular coded bins and hence rely on context models. As listed in TABLE 1, 84 context models are involved in rate estimation and each context model is stored in a seven-bit register. Therefore, there are 84×4 seven-bit registers in the table for four-level context models.

According to the input signal "CU_type", context models for a specific CU size are loaded into the local register arrays for syntax groups A-D. As been discussed above, the use of local context models reduces data access time and avoids improper update of the global context models. For an 8×8 CU, its partition modes (i.e., PART_2N×2N and PART_N×N) share the same initial values of context models. The global context models update begins after the rate-distortion mode decision of a certain CU block. "CU_type" specifies which level of global context models to update. If "CU_type" indicates it is a 16×16 CU, the corresponding global context models belong to Level-1. After comparing the RD costs of this 16×16 CU and its four 8×8 sub-CUs, the new context models will be selected by mode decision to update both Level-1 and Level-0 of the global context model table.

Implementation Results

Experiments have been conducted to evaluate the efficiency of the preferred rate estimator of FIG. 3. A benchmark containing only luma rate estimator has been established, while the chroma rate is estimated by non-zero quantized coefficients. A strategy of mode reduction is first applied to all PUs. For luma 4×4 PUs, three most probable modes, one regular mode (planar, DC, vertical, horizontal), and three extra modes with minimal Hadamard cost are evaluated by RDO. For luma 8×8, 16×16, and 32×32 PUs, three most probable modes and one extra mode with minimal Hadamard cost are sent to RDO. For luma 64×64 PUs, only the most probable mode is checked by RDO process. Then, the best luma prediction mode will be selected according to RDO cost which is calculated using distortion and rate. Here rate is estimated by the original CABAC rate estimation algorithm. For all chroma PUs, four regular prediction modes, including planar, DC, vertical, and horizontal modes, are supported. Chroma mode is selected by a modified RDO algorithm, in which chroma rate is simply replaced by the number of non-zero coefficients after quantization. Compared with HM 15.0, the benchmark introduces about 4.25% BD-Rate and 0.24 dB BD-PSNR loss for 21 video test sequences with QP values (22, 27, 32 and 37). The preferred rate estimator is then applied to this benchmark and brings a decrease of 0.005% in BD-Rate and an increase of 0.0092 dB in BD-PSNR gain against the benchmark. The luma-based CABAC rate estimation is thus verified to be a reasonable approach that retains superior compression efficiency and low complexity. Comparison results are provided in TABLE 4.

TABLE 4

Comparison of experimental results between rate estimation in HM and the proposed hardware architecture.

| Class | Sequences | Proposed Algorithm in [14] vs. Rate Estimation in Standard HM | | Proposed Algorithm in [15] vs. Rate Estimation in Standard HM | | Proposed Algorithm in [17] vs. Rate Estimation in Standard HM | | Rate Estimation in HM (luma-only) vs. Rate Estimation in Standard HM | | Proposed Rate Estimator (luma-only, without "split_cu_flag") vs. Rate Estimation in HM (luma-only) | |
|---|---|---|---|---|---|---|---|---|---|---|---|
| | | BD-Rate [%] | BD-PSNR [dB] | BD-Rate [%] | BD-PSNR [dB] | BD-Rate [%] | BD-PSNR [dB] | BD-Rate [%] | BD-PSNR [dB] | ΔBD-Rate [%] | ΔBD-PSNR [dB] |
| A | People On Street | 6.0792 | −0.2988 | 4.61 | −0.21 | 5.18 | −0.251 | 3.4417 | −0.1680 | −0.1935 | 0.0093 |
| | Traffic | 6.8206 | −0.3144 | 4.34 | −0.21 | 4.73 | −0.219 | 4.7199 | −0.2160 | −0.0913 | 0.0039 |
| B | Park Scene | 5.5244 | −0.2124 | 3.39 | −0.11 | 3.97 | −0.154 | 3.5296 | −0.1358 | −0.1252 | 0.0047 |
| | Kimono | N/A | N/A | 4.39 | −0.12 | 3.42 | −0.109 | 3.0720 | −0.0983 | 0.6355 | −0.0221 |
| | Basketball Drive | N/A | N/A | 6.73 | −0.17 | 7.39 | −0.200 | 3.6115 | −0.0954 | 0.2915 | −0.0079 |
| | BQ Terrace | N/A | N/A | 4.32 | −0.19 | 4.99 | −0.198 | 2.4140 | −0.0935 | −0.0633 | 0.0023 |
| | Cactus | 6.3472 | −0.2033 | 4.28 | −0.14 | 5.7 | −0.180 | 4.1528 | −0.1300 | −0.0126 | 0.0000 |
| C | Basketball Drill | 6.2641 | −0.2801 | 4.63 | −0.21 | 8.91 | −0.394 | 8.6861 | −0.3730 | −0.2156 | 0.0088 |
| | BQ Mall | 6.0363 | −0.2921 | 4.15 | −0.20 | 6.23 | −0.303 | 3.3237 | −0.1625 | −0.1520 | 0.0075 |
| | Party Scene | 4.4986 | −0.2891 | N/A | N/A | 5.39 | −0.335 | 3.4397 | −0.2052 | −0.0890 | 0.0051 |
| | Race Horses C | N/A | N/A | 3.38 | −0.19 | 5.74 | −0.289 | 4.0470 | −0.1967 | −0.0425 | 0.0022 |
| D | Basketball Pass | N/A | N/A | 4.80 | −0.24 | 7.28 | −0.394 | 4.7913 | −0.2554 | −0.0645 | 0.0034 |
| | Blowing Bubbles | N/A | N/A | 3.44 | −0.19 | 5.91 | −0.348 | 3.5473 | −0.2011 | −0.0740 | 0.0042 |
| | BQ Square | N/A | N/A | 1.97 | −0.15 | 6.41 | −0.415 | 3.0824 | −0.1945 | −0.0444 | 0.0026 |
| | Race Horses | N/A | N/A | N/A | N/A | 6.78 | −0.363 | 5.1280 | −0.4363 | −0.1001 | 0.1752 |
| E | Kristen And Sara | N/A | N/A | 5.86 | −0.24 | 7.88 | −0.355 | 4.1179 | −0.1883 | 0.2092 | −0.0096 |
| | Four People | N/A | N/A | N/A | N/A | 5.79 | −0.291 | 3.2739 | −0.1698 | −0.0528 | 0.0024 |
| | Johnny | N/A | N/A | 5.15 | −0.21 | 8.03 | −0.302 | 2.6748 | −0.1067 | 0.1167 | −0.0045 |
| F | Slide Editing | N/A | N/A | N/A | N/A | N/A | N/A | 5.1133 | −0.6313 | −0.0548 | 0.0072 |
| | Slide Show | N/A | N/A | N/A | N/A | N/A | N/A | 7.0305 | −0.5850 | 0.0217 | −0.0010 |
| | China Speed | N/A | N/A | N/A | N/A | N/A | N/A | 6.0791 | −0.4702 | −0.0034 | 0.0000 |
| | Average value | 5.939 | −0.270 | 4.362 | −0.185 | 6.096 | −0.283 | 4.25 | −0.24 | −0.005 | 0.0092 |

The FIG. 3 hardware architecture has been implemented in Verilog and synthesized in FPGAs and ASICs. Performance of the hardware architecture is nearly identical to the table-based CABAC bit rate estimation algorithm in HM 15.0 reference software. Both the reference software and the present method process the same syntax, although the present methods can ignore the flag "split_cu_flag". Artisans will appreciate that the present method performs well in the hardware implementation, and there is no performance loss.

The impact to rate estimation of ignoring the "split_cu_flag" was evaluated. A proposed hardware design of luma-based rate estimator without "split_cu_flag" has been implemented and compared with the luma-based CABAC rate estimation in HM 15.0. As shown in last two columns in TABLE 4, the present hardware architecture decreases the average BD-Rate by 0.005% and increases the average BD-PSNR by 0.0092 dB for the video sequences tested. The present hardware architecture thus improves compression efficiency as compared to the table-based luma-only CABAC rate estimation in HM. Omitting "split_cu_flag" improves the video compression efficiency and also results in fewer hardware requirements.

TABLE 5 shows the obtained PSNR and the required number of clock cycles to accomplish rate estimation using an embodiment of the proposed highly-parallel rate estimator where R=5. Various CU/PU sizes (4×4 PUs, 8×8 CUs, 16×16 CUs, 32×32 CUs, and 64×64 CUs) and QP values (22, 24, 26, 28, 30, 32, 34 and 37) are shown. Experimental results of all test sequences in classes A and B are provided. In time-constrained, high-performance video coding applications, this table is useful for fast CU decisions in real-time operation. For example, based on the PSNR expectation and the maximum allowable time to process, the best CU size is roughly determined based on TABLE 5. For another example, if QP is selected as 22 in the test sequence "People on Street", if one 16×16 CU and four sub 8×8 CUs result in the same RD cost, the 16×16 CU needs 145 clock cycles for rate estimation, while four sub 8×8 CUs need 162 clock cycles for rate estimation. From a processing time point of view, this 16×16 CU is advantageous since 17 clock cycles are saved.

Figure 10B:
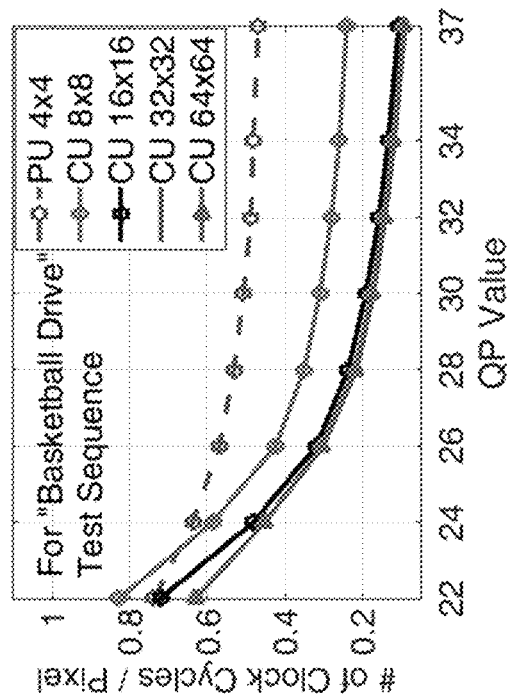
FIG. 10B shows the required number of clock cycles varying with QP values for the test sequence "Basketball Drive" in an embodiment where R=5.
Figure 10A:
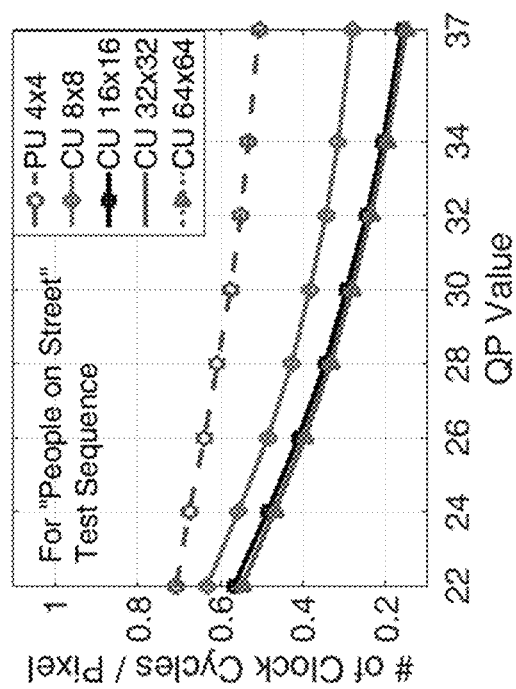
FIG. 10A shows the required number of clock cycles varying with QP values for the test sequence "People on Street" in an embodiment where R=5.

For each CU size, FIG. 10A and FIG. 10B illustrate how the required number of clock cycles per pixel (i.e., the hardware processing time for rate estimation per pixel)

TABLE 5

Experimental PSNR and clock cycles results of for an embodiment of the proposed highly parallel bit rate estimator where R = 5. Various PU/CU sizes and QP values are shown.

| | | QP = 22 | | | | | | QP = 24 | | | | | |
|---|---|---|---|---|---|---|---|---|---|---|---|---|---|
| Class | Sequence | PSNR | 4 × 4 | 8 × 8 | 16 × 16 | 32 × 32 | 64 × 64 | PSNR | 4 × 4 | 8 × 8 | 16 × 16 | 32 × 32 | 64 × 64 |
| A | People on Street | 43.28 | 11.3 | 40.4 | 144.9 | 560 | 2232 | 42.40 | 10.8 | 35.6 | 124.0 | 480 | 1912 |
| A | Traffic | 43.47 | 11.0 | 37.4 | 131.1 | 512 | 2043 | 42.65 | 10.4 | 33.4 | 111.3 | 436 | 1740 |
| B | Basketball Drive | 43.28 | 11.8 | 53.0 | 184.6 | 646 | 2574 | 42.40 | 10.2 | 37.5 | 123.1 | 462 | 1851 |
| B | BQ Terrace | 43.65 | 14.1 | 63.6 | 240.0 | 937 | 3756 | 42.90 | 13.1 | 58.3 | 217.3 | 850 | 3401 |
| B | Cactus | 42.92 | 13.5 | 62.9 | 244.1 | 931 | 3720 | 41.91 | 11.8 | 49.7 | 190.6 | 760 | 3035 |
| B | Kimono | 44.00 | 10.0 | 27.6 | 89.6 | 336 | 1313 | 43.36 | 9.4 | 22.0 | 58.3 | 232 | 904 |
| B | Park Scene | 42.65 | 12.0 | 48.4 | 182.6 | 722 | 2892 | 41.54 | 11.0 | 40.7 | 145.1 | 594 | 2380 |

| | | QP = 26 | | | | | | QP = 28 | | | | | |
|---|---|---|---|---|---|---|---|---|---|---|---|---|---|
| Class | Sequence | PSNR | 4 × 4 | 8 × 8 | 16 × 16 | 32 × 32 | 64 × 64 | PSNR | 4 × 4 | 8 × 8 | 16 × 16 | 32 × 32 | 64 × 64 |
| A | People on Street | 41.61 | 10.2 | 31.0 | 105.0 | 405 | 1611 | 40.93 | 9.7 | 27.3 | 88.4 | 341 | 1357 |
| A | Traffic | 41.84 | 9.9 | 29.7 | 94.4 | 365 | 1457 | 41.08 | 9.4 | 26.6 | 79.9 | 306 | 1222 |
| B | Basketball Drive | 41.66 | 9.1 | 27.1 | 81.7 | 308 | 1249 | 41.05 | 8.5 | 22.4 | 60.5 | 220 | 901 |
| B | BQ Terrace | 42.13 | 11.9 | 50.8 | 188.2 | 739 | 2952 | 41.39 | 10.9 | 43.2 | 157.1 | 627 | 2500 |
| B | Cactus | 40.90 | 10.5 | 37.6 | 136.2 | 579 | 2316 | 39.98 | 9.7 | 30.8 | 100.1 | 416 | 1664 |
| B | Kimono | 42.69 | 8.9 | 19.6 | 43.5 | 165 | 650 | 41.99 | 8.6 | 18.4 | 36.0 | 127 | 506 |
| B | Park Scene | 40.40 | 10.3 | 35.2 | 118.8 | 481 | 1929 | 39.37 | 9.8 | 30.9 | 99.0 | 393 | 1577 |

| | | QP = 30 | | | | | | QP = 32 | | | | | |
|---|---|---|---|---|---|---|---|---|---|---|---|---|---|
| Class | Sequence | PSNR | 4 × 4 | 8 × 8 | 16 × 16 | 32 × 32 | 64 × 64 | PSNR | 4 × 4 | 8 × 8 | 16 × 16 | 32 × 32 | 64 × 64 |
| A | People on Street | 40.35 | 9.2 | 24.5 | 75.3 | 288 | 1147 | 39.63 | 8.8 | 22.0 | 62.8 | 242 | 964 |
| A | Traffic | 40.44 | 9.0 | 24.0 | 68.5 | 258 | 1030 | 39.63 | 8.7 | 21.7 | 57.8 | 217 | 866 |
| B | Basketball Drive | 40.53 | 8.1 | 19.8 | 48.9 | 175 | 719 | 39.89 | 7.8 | 17.9 | 40.1 | 144 | 595 |
| B | BQ Terrace | 40.77 | 10.2 | 36.9 | 131.8 | 527 | 2102 | 39.97 | 9.6 | 31.9 | 109.5 | 442 | 1765 |
| B | Cactus | 39.19 | 9.2 | 26.6 | 80.8 | 320 | 1287 | 38.27 | 8.8 | 23.4 | 66.0 | 257 | 1035 |
| B | Kimono | 41.41 | 8.3 | 17.7 | 31.2 | 103 | 412 | 40.63 | 8.1 | 17.0 | 27.2 | 86.1 | 347 |
| B | Park Scene | 38.46 | 9.3 | 27.2 | 83.2 | 322 | 1290 | 37.45 | 8.9 | 23.7 | 68.1 | 260 | 1039 |

| | | QP = 34 | | | | | | QP = 37 | | | | | |
|---|---|---|---|---|---|---|---|---|---|---|---|---|---|
| Class | Sequence | PSNR | 4 × 4 | 8 × 8 | 16 × 16 | 32 × 32 | 64 × 64 | PSNR | 4 × 4 | 8 × 8 | 16 × 16 | 32 × 32 | 64 × 64 |
| A | People on Street | 38.90 | 8.5 | 20.1 | 52.6 | 201 | 804 | 37.98 | 8.1 | 17.9 | 40.8 | 153 | 618 |
| A | Traffic | 38.80 | 8.4 | 19.9 | 49.2 | 180 | 723 | 37.76 | 8.1 | 17.7 | 38.6 | 137 | 551 |
| B | Basketball Drive | 39.22 | 7.7 | 16.6 | 34.1 | 120 | 496 | 38.39 | 7.5 | 15.4 | 27.2 | 92 | 381 |
| B | BQ Terrace | 39.14 | 9.1 | 28.2 | 92.2 | 370 | 1474 | 38.07 | 8.6 | 23.8 | 71.8 | 280 | 1119 |
| B | Cactus | 37.37 | 8.4 | 21.1 | 55.1 | 208 | 842 | 36.26 | 8.1 | 18.4 | 42.2 | 153 | 621 |
| B | Kimono | 39.79 | 7.9 | 16.4 | 24.2 | 73.7 | 298 | 38.69 | 7.7 | 15.5 | 20.8 | 59.5 | 241 |
| B | Park Scene | 36.46 | 8.5 | 20.9 | 55.7 | 206 | 825 | 35.28 | 8.1 | 17.9 | 40.7 | 145 | 578 | varies with QP values for an embodiment where R=5. Regardless of CU size, the required number of clock cycles per pixel drops drastically as QP value increases for both video test sequences. This is because a larger QP value leads to fewer non-zero coefficients after the quantization step. Thus, fewer syntax elements undergo binarization. In addition, updating context models is also less frequent. Therefore, the required processing time per pixel for rate estimation is reduced as QP increases.

Figure 11B:
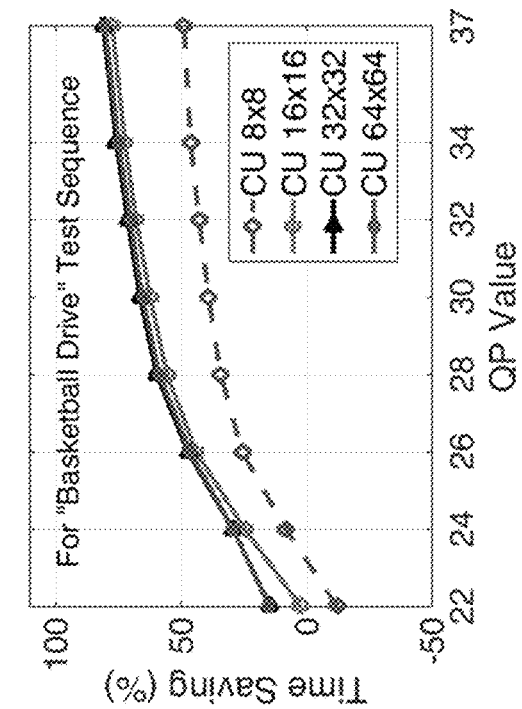
FIG. 11B shows the processing time-saving percentage with respect to a 4×4 PU varying with QP values for the text sequence "Basketball Drive" in an embodiment where R=5.
Figure 11A:
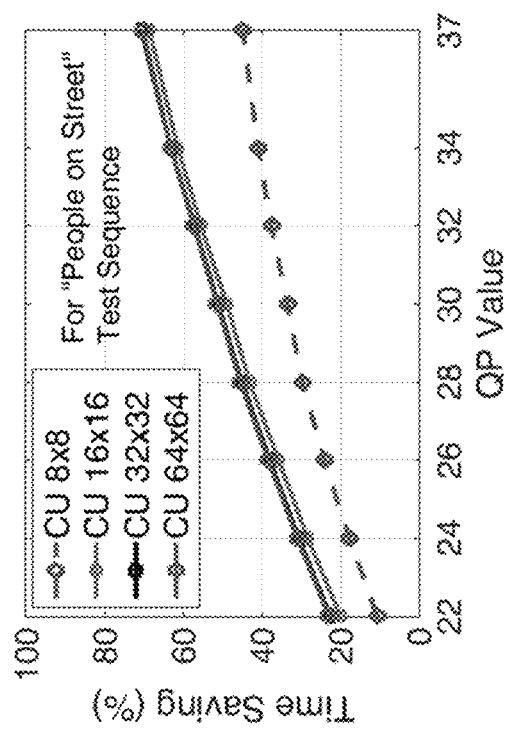
FIG. 11A shows the processing time-saving percentage with respect to a 4×4 PU varying with QP values for the text sequence "People on Street" in an embodiment where R=5.

FIG. 11A and FIG. 11B plot time-saving percentages of CUs from 8×8 to 64×64 with respect to PUs 4×4 for different QP values. Despite all CU sizes with larger QP values requiring less processing time for rate estimation, it is observed that the curves for CUs 16×16, 32×32 and 64×64 are almost identical with the most notable time savings. Therefore, for a given QP value, the throughput of the present highly parallel rate estimator of FIG. 3 is the highest for CUs 16×16, 32×32 and 64×64. This observation is explained as follows. The bit rate is composed by coded bits of all quantized coefficients and header syntax. Quantized coefficients scale down with a larger QP value, while header syntax does not. With a larger quantization step in high QP scenarios, fewer coded bits of quantized coefficients are obtained. Thus, header syntax gradually dominates processing time of bit rate estimation for larger CUs.

The present hardware architecture for a rate estimator was synthesized for Arria II GX and Altera Stratix V GX FPGA platforms. The resource consumption, frequency, rate estimation performance, and supported TU/CU sizes are provided in TABLE 6. The present highly-parallel rate estimation architecture has also been synthesized and implemented in an ASIC design using TSMC 90 nm technology as shown in TABLE 1. Results were obtained from the Synopsys Design Compiler under the normal corner of TSMC 90 nm process, at a 1.0 V supply voltage and at room temperature. There are 13 total rate estimators being instantiated in order to satisfy the throughput requirement of the system (3840× 2160p @ 30 fps). The numbers of rate estimators corresponding to 4×4, 8×8, 16×16, 32×32, and 64×64 PUs are 7, 2, 2, 1, and 1, respectively. An HEVC intra encoder hardware is also implemented to evaluate the entire intra encoder throughput using the present rate estimators. As shown in TABLE 1, the entire intra encoder system sustains real-time encoding of 3840×2160p @ 30 fps.

quency, supported TU sizes, the relationship among clock cycles, QP, CU size and PSNR, and rate estimation accuracy are included. The non-zero coefficient counting algorithm in Johar and Alwani, "Method for fast bits estimation in rate distortion for intra coding units in HEVC," *Proc. IEEE Consum. Commun. Netw.*, 2013) and Zhu et. al (*Proc. 19th ASP DAC*, (2014) and the bin counting algorithm in Pastuszak and Abramowski, Algorithm and architecture design of the H.265/HEVC intra encoder," *IEEE Trans. Circuits Syst. Video Technol.* 26 (1), (2016) result in lower accuracy because they are incompatible with the default CABAC-based rate estimation approach. These three works require preprocessing to establish simplified rate estimation models. Because these simplified rate models are experimentally determined from limited video test sequences, there is no rigid theoretical proof to bind the rate estimation accuracy in general video scenarios. Hence, the accuracy of simplified rate estimation model may vary widely depending on video contents. The CFBAC algorithm in Tsai et. al. A 1062 Mpixels/s 8192×4320p high efficiency video coding (H.265) encoder chip," *Proc. Symp. VLSI Circuits*, (2013) utilizes fixed context models without adaptive updates. No design effort was reported by Tsai et. al. to improve the level of parallelism for rate estimation. The rate estimator hardware costs 56.8 k gates for binarization and 120.4 k gates for CFBAC rate estimation. The proposed highly parallel design results in an increase of 11% in hardware resources (197 k gates). However, the present design leads to a decrease of 0.005% in BD-Rate, while the work of Tsai et. al. results in an increase of 1.1%. The CABAC architecture in Huang et. al., "Fast algorithms and VLSI architecture design for HEVC intra-mode decision," *J. Real-Time Image Process.*, 12 (2), 2015) improves the throughput of CABAC-based rate estimator by context adaption of 2 bottleneck syntax elements, while the remaining 14 syntax elements are still processed in a serial manner. The required hardware cost and power consumption are not reported and 64×64 CUs are not supported in Huang et. al. When contrasted with Pastuszak and Abramowski under iso-throughput conditions (i.e., 3840×2160 @ 30 fps), the present invention requires 197 k logic gates and consumes 76 mW versus 53.1 k logic gates and 13.3 mW power consumption for the Pastuszak and Abramowski technology. The data-driven statistical rate estimation model of Pastuszak and Abramowski cannot

TABLE 6

Resource consumption comparison of rate estimation hardware designs.

|  | Pastuszak [17] | This work (for a proposed rate estimator instance) | |
| --- | --- | --- | --- |
| Architecture | Arria II GX | Arria II GX | Altera Stratix V GX |
| FPGA Platform | [ALUT] | [ALUT + Registers] | [ALUT + Registers] |
| Logic Gate Count | 8441 (for main reconstruction loop) 3909 (for 4 × 4 reconstruction loop) | 3779 + 1304 * | 3764 + 1262 ** |
| Frequency (MHz) | 100 (for main reconstruction loop) 200 (for 4 × 4 reconstruction loop) | 115 | 208 |
| Supported PU/CU sizes | 8 × 8, 16 × 16, 32 × 32 CUs | 4 × 4 PU, 8 × 8, 16 × 6, 32 × 32, 64 × 64 CUs | |

* 197 ALUTs and 442 registers are used for global context models and initialization logic, which are shared by multiple rate estimator instances.
** 166 ALUTS and 393 registers are used for global context models and initialization logic, which are shared by multiple rate estimation instances.

TABLE 1 summarizes the comparison of a preferred embodiment of the invention with existing rate estimation hardware designs in the literature. The algorithm for rate estimation, implementation technology, area, power, freguarantee a good accuracy of bit rate estimation for any given video file. In contrast, the present CABAC rate estimator fully conforms to the computational theory and procedure of CABAC bit estimation (i.e., binarization and context-adaptive probability modeling), so good rate estimation accuracy can be ensured and the estimation accuracy may change very slightly with video contents. Therefore, the rate estimation accuracy and reliability of our proposed design are much improved.

Preferred Application

One preferred application of this invention is a highly parallel hardware architecture for rate estimation in HEVC intra encoder to increase the level of parallelism and reduce computational time. The adopted rate estimation algorithm is fully compatible with the context-adaptive binary arithmetic coding (CABAC) bit rate estimation except that it ignores a syntax element "split_cu_flag". Design considerations, analysis, and circuit implementation are elaborated above. This design has been verified with the HM-15.0 reference software. It achieves an average decrease of 0.005% and an average increase of 0.0092 dB in BD-Rate and BD-PSNR, respectively. The preferred hardware architecture was implemented in Verilog and synthesized in FPGAs and ASICs. It supports resolutions up to 3840×2160 @ 30 fps. Compared with state-of-the-art hardware designs for rate estimation in the literature, the present architecture achieves substantial performance improvement in rate estimation accuracy and reliability, with the overhead of a relatively larger chip area and higher power consumption. The present inventors believe also that this is the first highly parallel hardware architecture for a table-based CABAC bit rate estimator, which is generally applicable in time-constrained, high-performance video coding applications.

While several particular embodiments of the present bit rate estimator have been described herein, it will be appreciated by those skilled in the art that changes and modifications may be made thereto without departing from the invention in its broader aspects.

What is claimed is:

1. A method for estimating bit rate in a high efficiency video encoder encoding for a high efficiency video coding standard comprising: separating syntax elements of the high efficiency video coding standard into a plurality of independent groups of related syntax elements; assigning local context tables to at least some of the groups of related syntax elements; loading a latest global context model into at least two of the local context tables; simultaneously and independently conducting binarization and rate estimation of bins derived according to local context table bin values; updating a look-up table of fractional rate; and passing group bit numbers from the independent groups to a fractional rate accumulator to determine a total bit rate.

2. The method of claim 1, wherein a new round of the simultaneously and independently conducting binarization and rate estimation is commenced when a main controller of the video encoder is idle.

3. The method of claim 1, wherein said separating comprises sorting syntax elements for luma rate estimation into the plurality of independent groups.

4. The method of claim 1, wherein each of the plurality of independent groups is sequentially independent from each other independent group.

5. The method of claim 1, wherein the standard is H.265, and the plurality of independent groups is five.

6. The method of claim 5, wherein the plurality of independent groups is defined as Groups A-E in the following table:

| Group | Syntax Elements for Luma Rate Estimation | Number of Context Models |
|---|---|---|
| A | prev_intra_luma_pred_flag | 1 |
|   | mpm_idx | 0 |
|   | rem_intra_luma_pred_mode | 0 |
|   | part_mode | 1 |
|   | cbf_luma | 2 |
|   | transform_skip_flag | 1 |
| B | last_sig_coeff_x_prefix | 15 |
|   | last_sig_coeff_y_prefix | 15 |
|   | last_sig_coeff_x_suffix | 0 |
|   | last_sig_coeff_y_suffix | 0 |
| C | coeff_abs_level_greater1_flag | 16 |
|   | coeff_abs_level_greater2_flag | 4 |
|   | coded_sub_block_flag | 2 |
| D | sig_coeff_flag | 27 |
| E | coeff_sign_flag | 0 |
|   | coeff_abs_level_remaining | 0 |
| Total | 16 syntax elements | 84. |

7. The method of claim 1, wherein the simultaneously and independently conducting binarization and rate estimation matches context-adaptive probability modeling with a bit stream encoder of the encoder.

8. The method of claim 1, wherein the simultaneously and independently conducting binarization and rate estimation is conducted in parallel through multiple rate estimator instances.

9. The method of claim 1, wherein the simultaneously and independently conducting binarization and rate estimation ignores the H.265 syntax element "split_cu_flag".

10. The method of claim 1, wherein the total bit rate consists of an accumulation of the fractional bit of each bin to provide the total number of bits and does not include binary arithmetic coding.

11. The method of claim 1, further comprising conducting rate distortion optimization using the total number of bits to select prediction modes and size partitions.

12. The method of claim 1, further comprising maintaining the global context model in a global context model buffer and loading the local context tables such that candidate prediction blocks of a same prediction model share the same initial context models that have been stored in the global context model buffer.

13. The method of claim 12, wherein said maintaining maintains the global context model buffer to ensure that each prediction block has the correct initial context model values and no global context model will be updated before mode decision is being made.

14. The method of claim 1, wherein said loading comprises loading a latest global context model into an internal register array as the local context tables.

* * * * *